US 8,646,206 B2

(12) United States Patent
Gilchrist

(10) Patent No.: US 8,646,206 B2
(45) Date of Patent: Feb. 11, 2014

(54) SYSTEM FOR PRESENCE DETECTION IN A DOOR ASSEMBLY

(75) Inventor: Jimmy Don Gilchrist, Tyler, TX (US)

(73) Assignee: Door Control Services, Inc., Ben Wheeler, TX (US)

( * ) Notice: Subject to any disclaimer, the term of this patent is extended or adjusted under 35 U.S.C. 154(b) by 0 days.

(21) Appl. No.: 13/355,738

(22) Filed: Jan. 23, 2012

(65) Prior Publication Data
US 2013/0186000 A1     Jul. 25, 2013

(51) Int. Cl.
*G08B 21/02* (2006.01)
(52) U.S. Cl.
USPC ................................. 49/13; 49/26; 340/573.1
(58) Field of Classification Search
USPC ................ 49/13, 14, 26–28, 197, 199, 25; 340/545.1, 666, 573.1; 200/61.43
See application file for complete search history.

(56) References Cited

U.S. PATENT DOCUMENTS

| | | | |
|---|---|---|---|
| 3,754,176 A | 8/1973 | Miller | |
| 4,115,952 A | 9/1978 | French | |
| 4,396,814 A | 8/1983 | Miller | |
| 4,620,072 A | 10/1986 | Miller | |
| 4,675,659 A * | 6/1987 | Jenkins et al. | 340/573.1 |
| 4,698,937 A * | 10/1987 | Kornbrekke et al. | 49/25 |
| 4,763,110 A | 8/1988 | Zucker | |
| 4,908,483 A | 3/1990 | Miller et al. | |
| 5,426,293 A | 6/1995 | Miller et al. | |
| 5,962,825 A | 10/1999 | Miller et al. | |
| 6,304,178 B1 * | 10/2001 | Hayashida | 340/545.1 |
| 6,396,010 B1 | 5/2002 | Woodward et al. | |
| 6,547,042 B1 * | 4/2003 | Collins | 187/317 |
| 6,683,296 B2 * | 1/2004 | Miller et al. | 250/221 |
| 6,689,970 B2 | 2/2004 | Burgess et al. | |
| 6,710,717 B2 * | 3/2004 | Slomowitz et al. | 340/686.1 |
| 6,720,874 B2 * | 4/2004 | Fufido et al. | 340/541 |
| 6,960,987 B2 * | 11/2005 | Dohi et al. | 340/286.05 |
| 7,151,450 B2 | 12/2006 | Beggs | |
| 7,466,237 B1 | 12/2008 | Cook | |

(Continued)

FOREIGN PATENT DOCUMENTS

GB     2479745     9/2011

OTHER PUBLICATIONS

Door Control Services, Inc., Top Door Alarm, Aug. 23, 2010, (via: http://web.archive.org/web/20100823023440/http://www.doorcontrolsusa.com/TopDoorAlarm/TopDoorOverview.asp).*

(Continued)

*Primary Examiner* — Katherine Mitchell
*Assistant Examiner* — Abe Massad
(74) *Attorney, Agent, or Firm* — Eric C. Schmalbach

(57) ABSTRACT

Embodiments of the invention are directed to a system of presence detection in a door assembly for the prevention of patient/detainee suicide, comprising: a door frame, wherein the door frame defines an opening; a door mounted in said opening, wherein the door is allowed to operate from open to closed position with respect to the door frame; a presence sensing arrangement, which allows detection of the presence of an object near the surfaces of the door, door frame, and the upper and lower surfaces of the door or door frame from open to closed position. Placement of presence sensors on the upper or lower surfaces of the door allows presence detection when a patient/detainee attempts to drape a ligature object across or underneath said surfaces. A control system may monitor the system, and can activate an alarm system for early detection and prevention.

19 Claims, 30 Drawing Sheets

(56) References Cited

U.S. PATENT DOCUMENTS

| | | | |
|---|---|---|---|
| 7,525,267 B2* | 4/2009 | Angiuli et al. | 318/282 |
| 7,999,690 B1* | 8/2011 | Shilts | 340/666 |
| RE42,991 E | 12/2011 | Cook | |
| 2007/0018814 A1 | 1/2007 | Adams | |
| 2010/0101149 A1 | 4/2010 | Keller | |
| 2010/0194563 A1* | 8/2010 | Berner et al. | 340/545.1 |
| 2010/0298656 A1* | 11/2010 | McCombie et al. | 600/301 |
| 2010/0325980 A1* | 12/2010 | Gilchrist | 52/204.1 |
| 2011/0068927 A1* | 3/2011 | Berger | 340/573.1 |
| 2011/0225886 A1 | 9/2011 | Block et al. | |
| 2011/0273290 A1* | 11/2011 | Gilchrist | 340/545.1 |

OTHER PUBLICATIONS

Securitech Brochure, "SEDA Emergency Door Alarm," Mar. 24, 2009, 2 pages.

Ekahau Safety Sheet, "Staff Safety," 2009, 2 pages.

Systems Technologies Product Specification Sheet, "VL965 Transmitter," Nov. 2005, 2 pages.

Ekahau Product Brochure, "Ekahau Positioning Engine," 2009, 2 pages.

VisionLink Product Brochure, "VisionLink Wireless Nurse Call System," 2005, 2 pages.

Gunnell et al., The epidemiology and prevention of suicide by hanging: a systematic review, International Journal of Epidemiology 2005; 34:433-442.

* cited by examiner

DOOR
SURFACES

SYSTEM FOR PRESENCE DETECTION IN A DOOR ASSEMBLY

CROSS REFERENCE TO RELATED APPLICATIONS

This application contains subject matter related to subject matter contained in co-pending U.S. Ser. No. 12/459,289 filed on Jun. 30, 2009 and incorporated herein by reference.

This application contains subject matter related to subject matter contained in co-pending U.S. Ser. No. 12/800,009 filed on May 6, 2010 and incorporated herein by reference.

BACKGROUND

Suicides among patients in mental health treatment facilities, detainment facilities, or in certain hospitals are becoming common occurrences. In some instances, the patient or detainee rigs an elongate flexible member, for example a strip of a bed sheet, blanket, curtain, etc., over a door (often the door of the patient or detainee's quarters) in order to hang himself. As an example, the patient/detainee may secure one end of the flexible elongate member to a door handle on one side of the door, and sling the flexible elongate member across the top of the door such that it depends downwardly along the other side of the door. Then, with the door either open or closed, the patient/detainee secures the free end of the flexible elongate member around his neck. The flexible elongate member, rigged generally as described above and secured around the neck of the patient/detainee, supports the body of the patient/detainee above the floor, thereby permitting the patient/detainee to hang himself until dead.

Early detection of suicide attempts is desirable for prevention of patient/detainee suicide. It is becoming more common for a patient/detainee to alter his methods of committing suicide to avoid being detected. For example, a patient/detainee may deploy the flexible elongate member along the surface of the door, near the door hinge, or at outer periphery points wherein the door frame receives the door. Additionally, a patient/detainee may "loop" the flexible elongate member around a door hinge or ligature point (in either an open or closed door position) to escape detection. A patient/detainee may also "wedge" a ligature system in between the door and hinge.

In some instances, a patient/detainee may secure one end of the flexible elongate member to one side of the door, and extend the flexible elongate member underneath the door, in the space between the bottom of the door and the door/frame and/or floor. The patient/detainee then lays down a distance from the door, and secures the other end of the flexible elongate member around his neck. The patient/detainee then axially rotates his body, such that the flexible elongate member is twisted during axial rotation. The patient/detainee repeats the process of axial rotation of the body until the flexible elongate member tightens around his neck causing death.

It is desirable to develop a system such that will allow early detection, and therefore prevention of patient/detainee suicide, especially in instances as previously set forth. Therefore, a need exists for a system to detect the presence of an object at or near the outer periphery surface of the door, the door frame, and the upper and lower surfaces of the door and door frame in either the open or closed position of the door.

SUMMARY

Embodiments of the invention are directed to solving the need for a system to detect the presence of an object near the outer periphery surface of the door, the door frame, and the upper and lower surfaces of the door in either the open or closed position before pressure is applied to a patient's neck. Embodiments of the invention comprise: a door frame, wherein said door frame defines an opening; a door mounted in the opening, wherein the door is allowed to operate in either an open or closed position with respect to the door frame; a presence sensing arrangement, which allows detection of the presence of an object at or near the surfaces of the door, door frame, and the upper and lower surfaces of the door in either the open or closed position of the door.

In one embodiment, the door frame exists such that it has two opposing door jambs and a header along the central opening for the placement of a door. The door frame of the embodiment axially rotates about a hinge system. The hinge system is a full mortise hinge, adapted such that communication signals can pass through the hinge system with one or more cables. The door axially rotates along the hinge system such that the door is either in an open or closed position. A presence sensing arrangement further comprises a plurality of photoelectric sensors. Each pair of photoelectric sensors is positioned such that a transmitter emits a beam of electromagnetic radiation, which is detected by the receiver. The presence of an object between the transmitter and receiver will trigger the sensor, which will be transmitted to a control system. A first pair of photoelectric sensors may be placed on the outer periphery of the inner side of the door (the side nearest the patient/detainee), at a distance of about the width of the door, near the top of the door. A second pair of photoelectric sensors may be placed on the outer periphery of the inner side of the header of the door frame (the side of the header nearest the patient/detainee), at a distance of about slightly wider than the width of the door, near the top of the door. A third pair of photoelectric sensors is placed on the lower surface of the door (the side of the door parallel with the floor). The photoelectric sensors allow for detection in both the open and closed position. A control system monitors the status of the system of and notifies appropriate personnel when the presence of an object is detected. The control system engages an alarm system upon the detection of presence. The alarm system can be a flashing light, with an audible alarm noise, and can be independently monitored through the control system. The embodiment allows the detection of the presence of an object or ligature along the door and door frame surfaces, including the top of the door or near the hinge system. The embodiment also allows for the early detection of presence wherein the patient/detainee drapes the flexible elongate member underneath the door or near the bottom surface of the door. Moreover, an advantage to the embodiment is the detection of presence (as opposed to pressure).

In an embodiment, the door frame, door, and hinge system are as described in the preceding paragraphs. However, in the embodiment, the presence sensing arrangement allows for photoelectric sensors placed on the outer surface of the door which is closest to the hallway (opposite the patient/detainee). In this manner, photoelectric sensors may be placed as follows: on the outer surface of the door (the side nearest the hallway and opposite the patient/detainee); one the outer side of the door frame (the side nearest the hallway and opposite the patient/detainee); on the outer periphery of the top side of the door (the side parallel with the door frame header and the ground); near the bottom of the door; along the spaces between the door and the door frame; and along the inner and outer periphery of the door surface, on both the inner and outer periphery surface of the door. The embodiment may also contain a control system and alarm system. The object of such a system is to sense the presence of an object at or near the door periphery (on both sides of the door), door frame, near the hinge, and on both the top and bottom surface of the door, for prevention of suicide attempts by the patient/detainee.

Other embodiments implement the use of wireless technology for interconnectivity. For example, in an embodiment, the door frame, door, and hinge system are as described in the preceding paragraphs. The presence sensing arrangement includes photoelectric sensors placed on the outer surfaces of the door and door frame. A wireless transmitter is located on the top surface of the door, and is connected to the photoelectric sensors. A power source is connected to the wireless transmitter. A wireless receiver is placed in a junction box. A control system is connected to the wireless receiver inside the junction box. The photoelectric sensors transmit a signal to the wireless transmitter upon the detection of an object. The wireless receiver receives the signal, and may communicate with a control panel.

In other embodiments of the invention, placement of individual pairs of photoelectric sensors may vary. For example, embodiments of the invention may comprise photoelectric sensors, which can be mounted to some or all of the peripheral surfaces of the door and door frame. Embodiments of the invention can contain one or a plurality of either door mounted sensors or frame mounted sensors, or permutations thereof.

In other embodiments, the type of door may vary. For example, the embodiments previously listed pertain to hinged doors or equivalents thereof. Embodiments of the current invention will also be directed towards sliding doors or equivalents thereof. A presence sensing arrangement may be placed at the bottom surface of such a sliding door system, as to detect the presence of an object underneath the door.

In other embodiments, the type of hinge may vary. For example, the hinge may be a full mortise hinge, a half mortise hinge, a full surface hinge, a pivot hinge, or equivalents thereof. Such hinges allow for function of a door in either an open or closed position.

In other embodiments, the type of presence sensor may vary. For example, the presence sensor may also be: sensors employing "thru beam" technology; sensors employing diffused technologies; multi-pixel sensors; laser sensors; fiber-optic sensors; ultra-sonic sensors, or equivalents and permutations thereof.

In other embodiments, presence detecting sensors are placed on the upper or lower surface of the door (the side parallel to the ground); the presence detecting sensors may be offset such to allow the beam to "shoot" around the hinge. This design is beneficial in embodiments of the invention employing the use of a pivot hinge.

Additionally, such photoelectric sensors may be arranged such that the path between the transmitter and receiver are perpendicular with the ground (as opposed to parallel in the previous paragraphs).

BRIEF DESCRIPTION OF THE DRAWINGS

These and other features, aspects and advantages of embodiments of the invention will become better understood with regard to the following description, appended claims, and accompanying drawings where:

DESCRIPTION

Overview

The following detailed description illustrates the preferred embodiment of the invention by way of example. This description will clearly enable one skilled in the art to make and use the invention, and will set forth the best mode of doing so. The embodiments listed herein are not intended to limit the scope of the invention. Several alternative embodiments are set forth, and it is contemplated that other permutations, arrangements, adaptations, uses, and variations of the invention.

Figure 1:
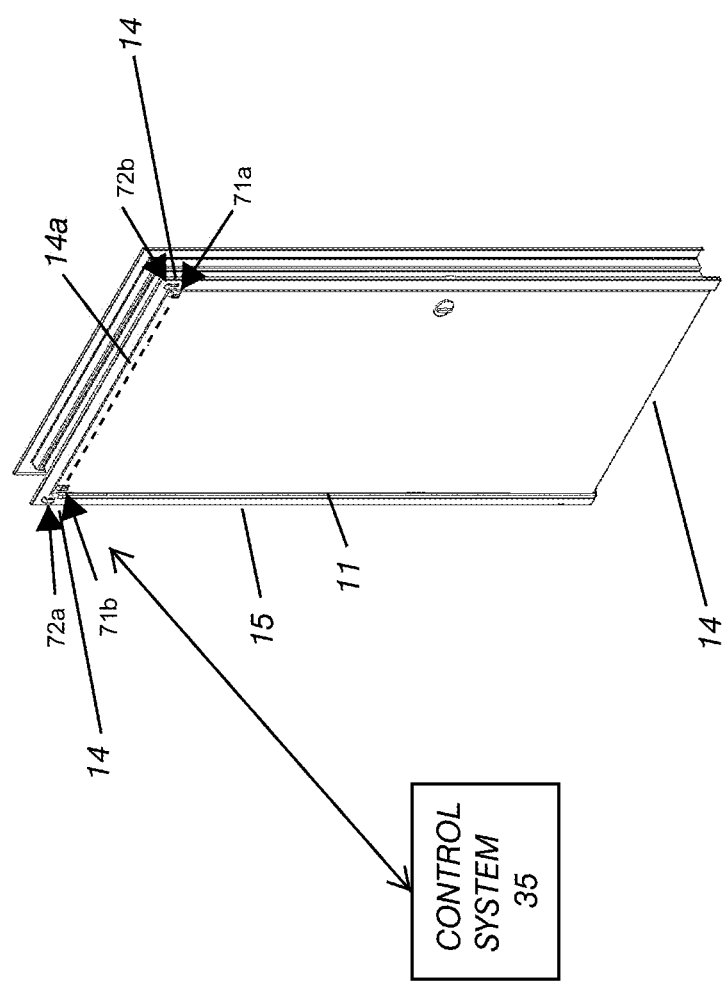
FIG. 1 illustrates a perspective view of a system of presence detection in a door assembly according to an embodiment of the invention.

As shown in FIG. 1, an embodiment for a system of presence detection comprises a door frame 15 wherein the door frame 15 defines an opening 16; a door 11 mounted in the opening 16, wherein the door 11 is allowed to operate from open to closed position with respect to the door frame 15; a presence sensing arrangement 14, which allows detection of an object near the surfaces of the door 11, door frame 15, and upper and lower surfaces of the door 11, door frame 15, in both open and closed position of the door 11. The embodiment may also comprise a control system 35. The control system 35 may also trigger an alarm system 18.

Detailed Description of the Elements

Figure 2:
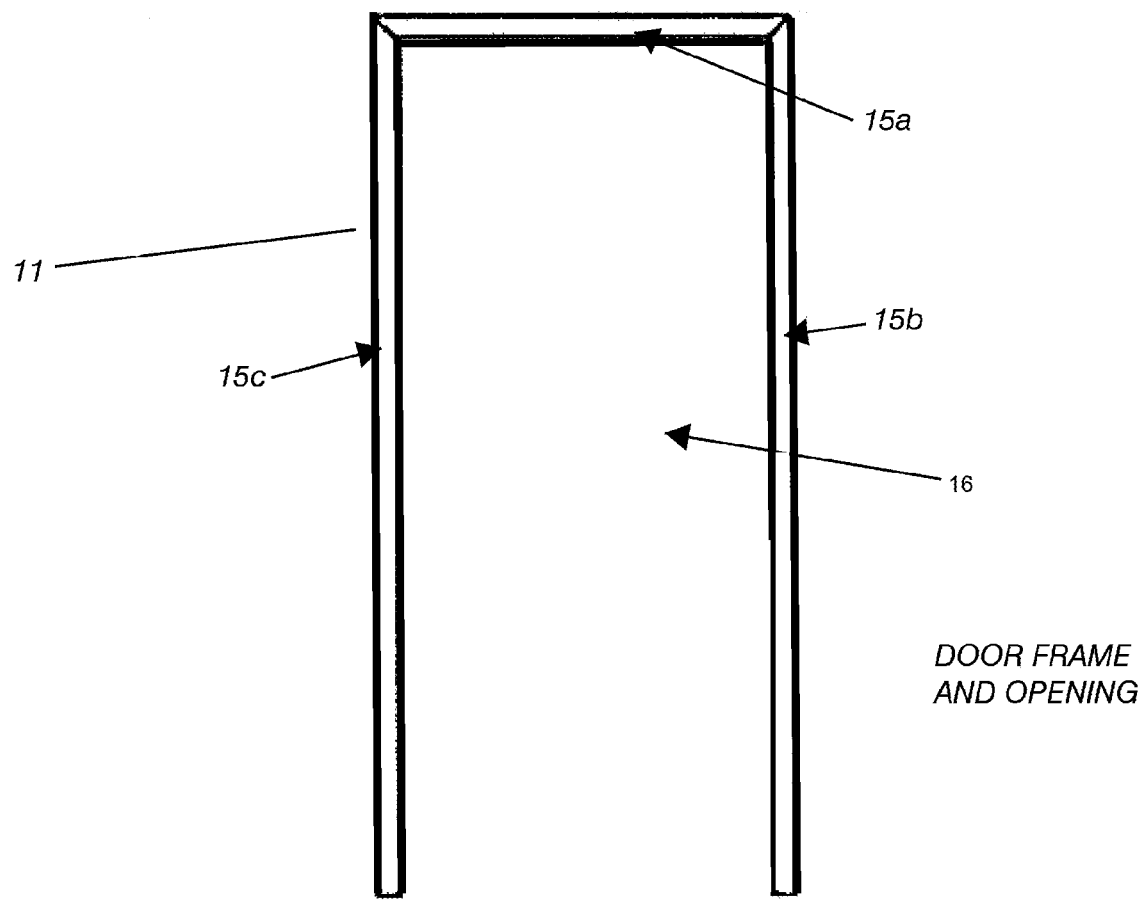
FIG. 2 illustrates a perspective view of a door frame and opening of the embodiment of FIG. 1.

As illustrated in FIG. 2, a door frame 15 defines an opening 16 for a door 11. The opening 16 of the door frame 15 is a substantially planar "nominal" aperture, configured such that the outer boundaries of the opening 16 allow cooperation of the door 11. The term "nominal" refers to the exact door opening (pocket) of the door frame 15, in which the door 11 will swing, as opposed to the overall door frame 15 width or height. The actual width and length of the door 11 is less than the "nominal" length to allow clearance for the door 11. For example, the width of the door 11 may be ¼" less than the nominal width, allowing for ⅛" clearance on each side of the door 11. Moreover, the height of the door 11 may be ⅞" smaller than the nominal height, to allow for ¾" clearance at the bottom of the door 11. The door frame 15 is further comprised of a header 15a, a lock jamb 15b, and a hinge jamb 15c as illustrated in FIG. 2.

The door frame 15 is comprised of substantially planar outer peripheral surfaces: a door frame face 61; a door frame stop 62; a door frame soffit 63; and a door frame rabbet 64. The door frame face 61 refers to the exposed surface of the door frame 15 which is substantially parallel with the opening 16. The door frame stop 62 refers to the surface of the door frame 15 which the door 11 closes against. The door frame soffit 63 refers to the surface of the door frame 15 between the two door frame stops 62. The door frame rabbet 64 refers to the recessed surface of the door frame 15 which receives the door 11. The surfaces of the door frame 15 are shown in FIGS. 24-27.

Figure 23:
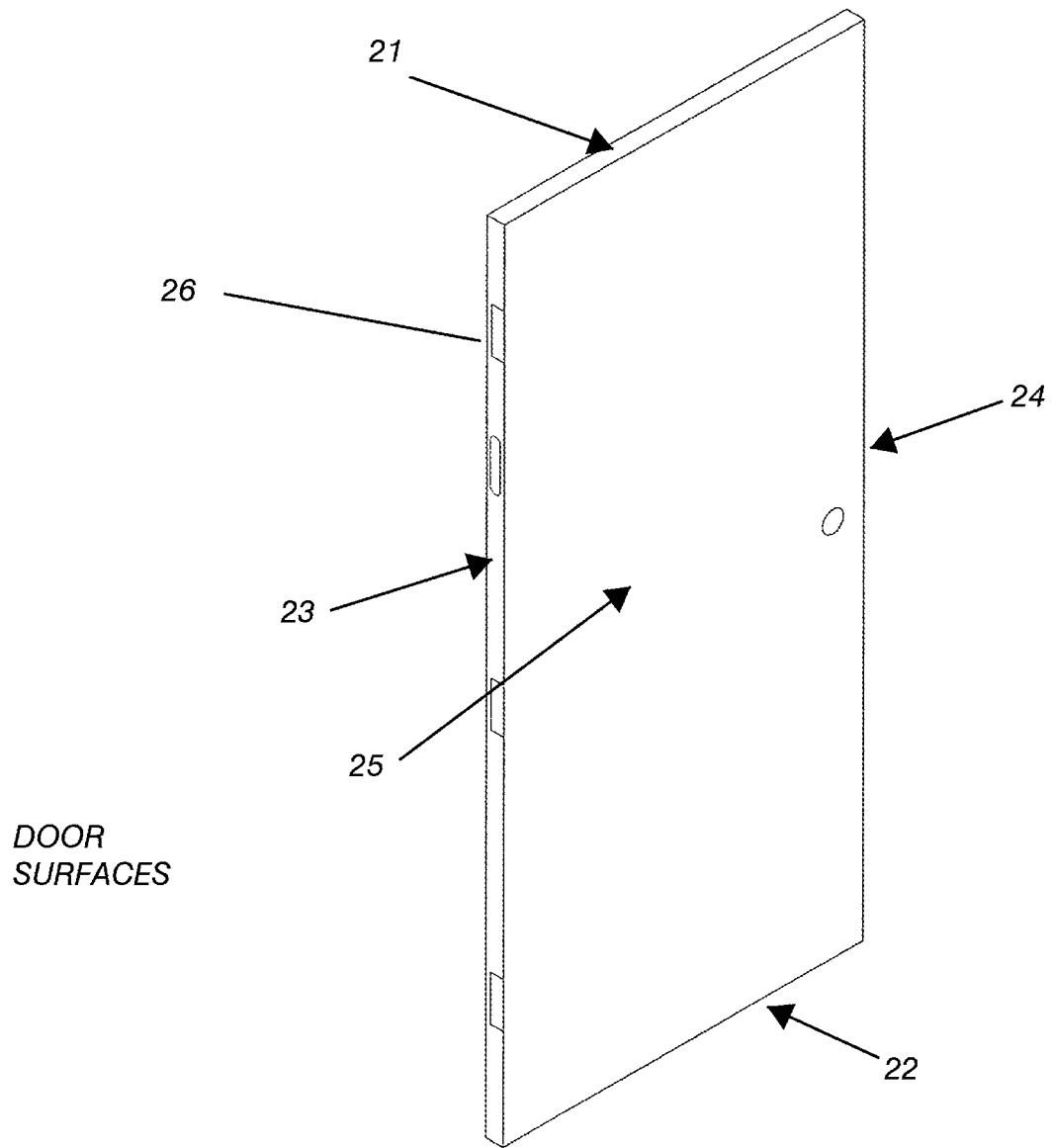
FIG. 23 illustrates a perspective view of a door, detailing door surfaces, according to embodiments of the invention.
Figure 24:
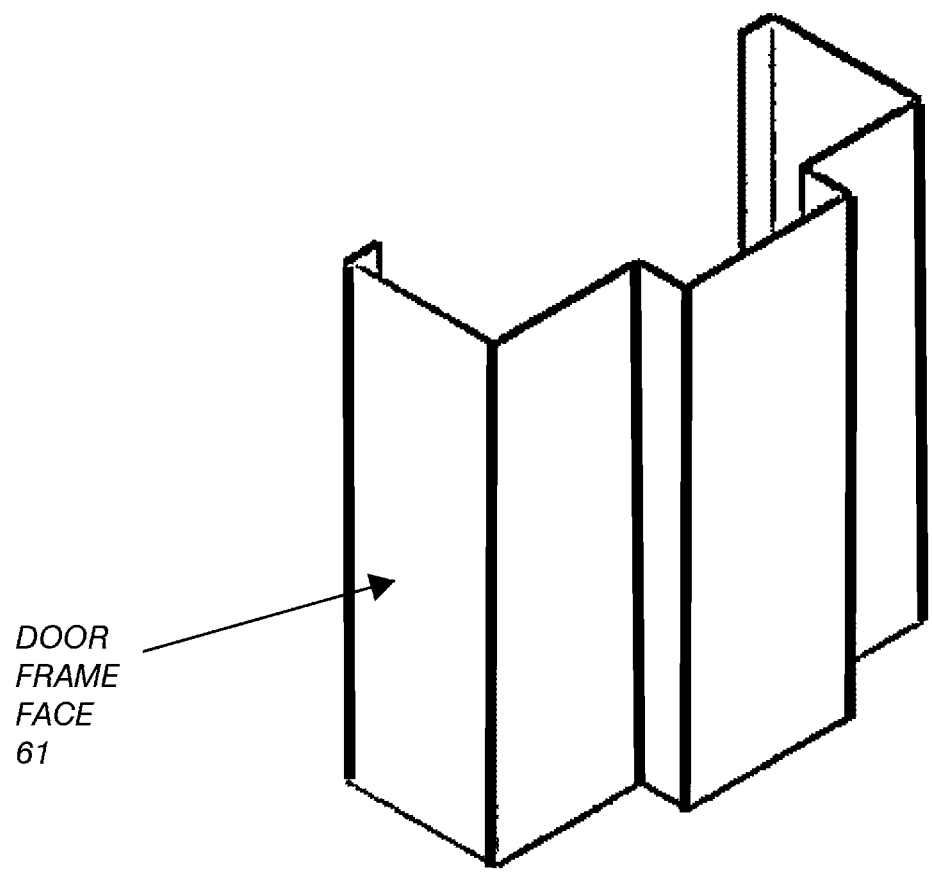
FIG. 24 illustrates a perspective view of a door frame face, according to embodiments of the invention.
Figure 25:
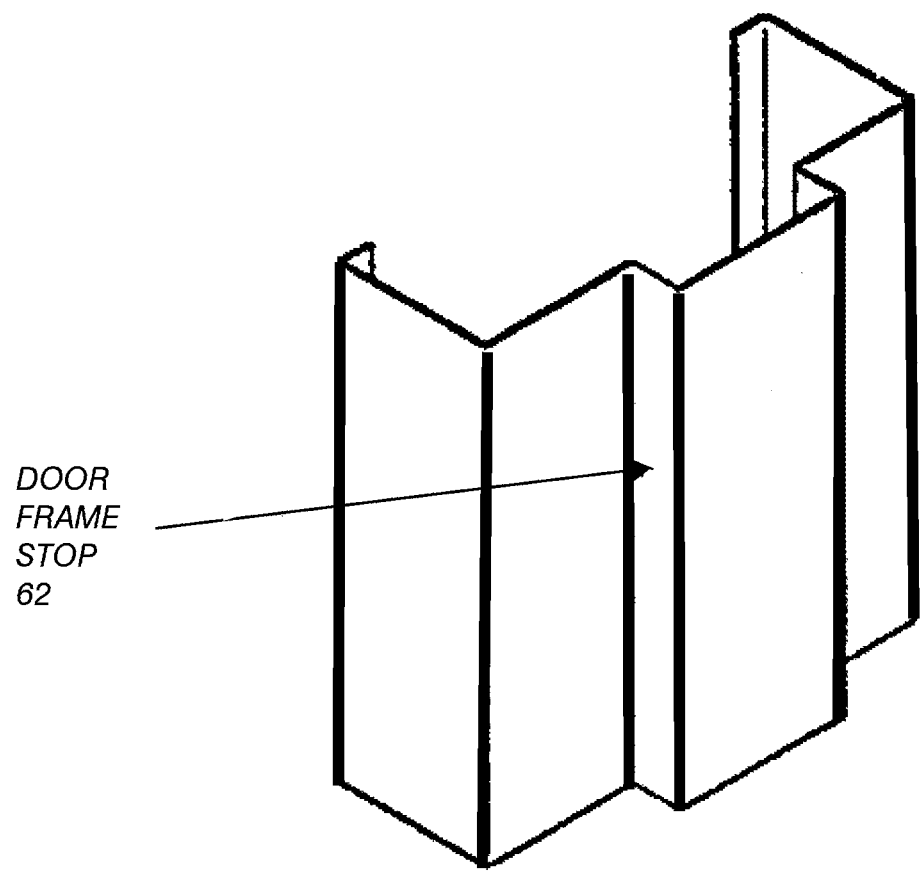
FIG. 25 illustrates a perspective view of a door frame stop, according to embodiments of the invention.
Figure 26:
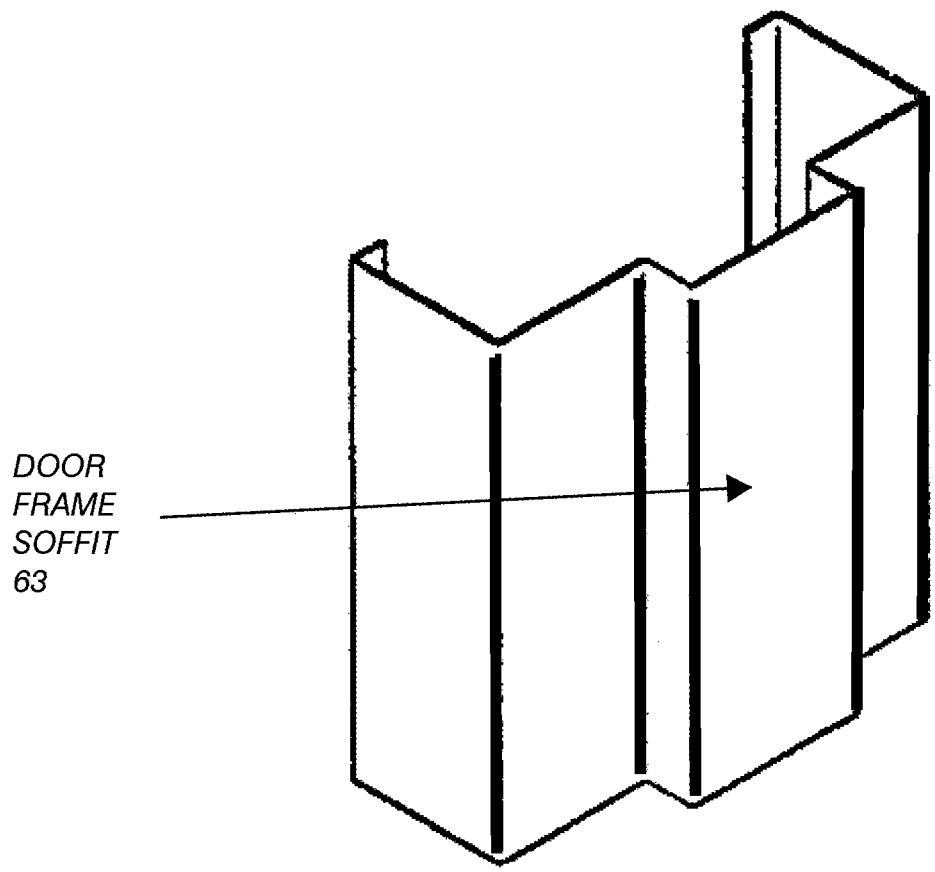
FIG. 26 illustrates a perspective view of a door frame soffit, according to embodiments of the invention.
Figure 27:
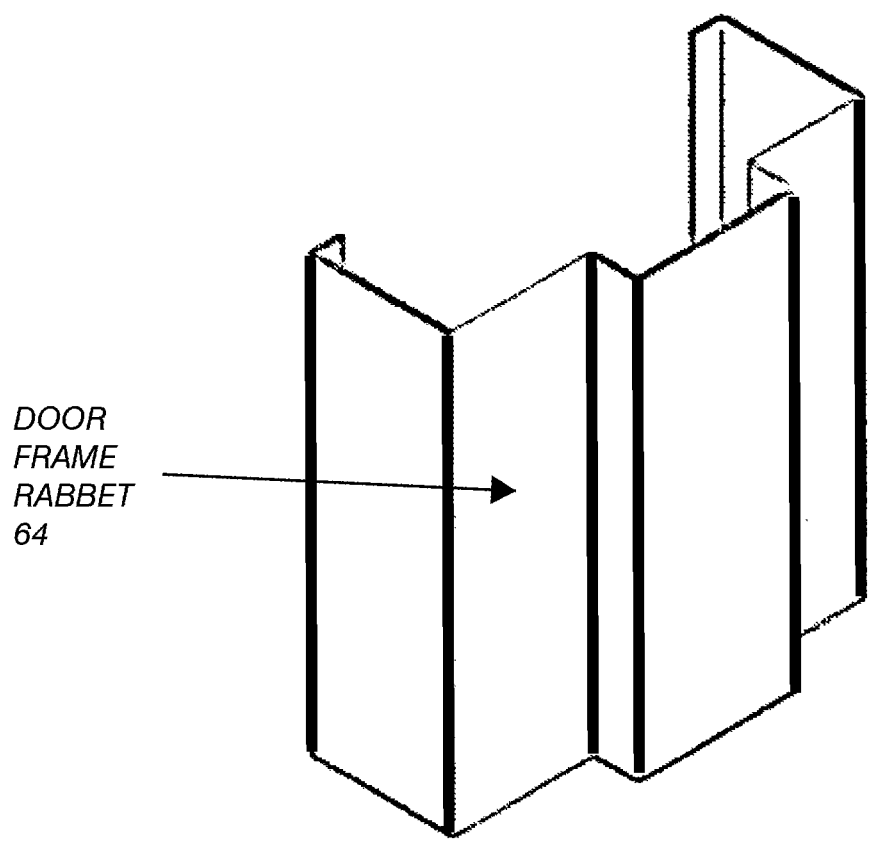
FIG. 27 illustrates a perspective view of a door frame rabbet, according to embodiments of the invention.

As shown in FIG. 23, a door 11 has six outer surfaces along its outer periphery: a top surface 21; a bottom surface 22; a hinge side surface 23; an opening side surface 24; a pull surface 25; and a push surface 26. The top surface 21 and bottom surface 22 are substantially parallel to the ground. The hinge side surface 23 is the side of the door nearest the hinge structure 13. The opening side surface 24 is the side of the door opposite the hinge side surface 23. The pull surface 25, is the surface of the door 11 facing the patient/detainee when the door 11 is shut. The push surface 26 is the surface of the door 11 facing the hallway and opposite the patient/detainee. The door 11 of the embodiment is hollow core.

A hinge system 13 in the exemplary embodiment is a full mortise hinge (however other hinge systems are contemplated by the invention). The door 11 cooperates with the opening 16, such that the door 11 is allowed to be open and shut by axially rotating about the hinge system 13. For purposes of description, "closed" refers to the position of the door 11 when shut, wherein the pull surface 25 and push surface 26 of the door 11 are substantially coplanar with the opening 16 and wall 12. Conversely, "open" refers to the position of the door 11 when open, wherein the door 11 has axially rotated about its hinge system 13, divergent from the "closed" position.

Figure 3:
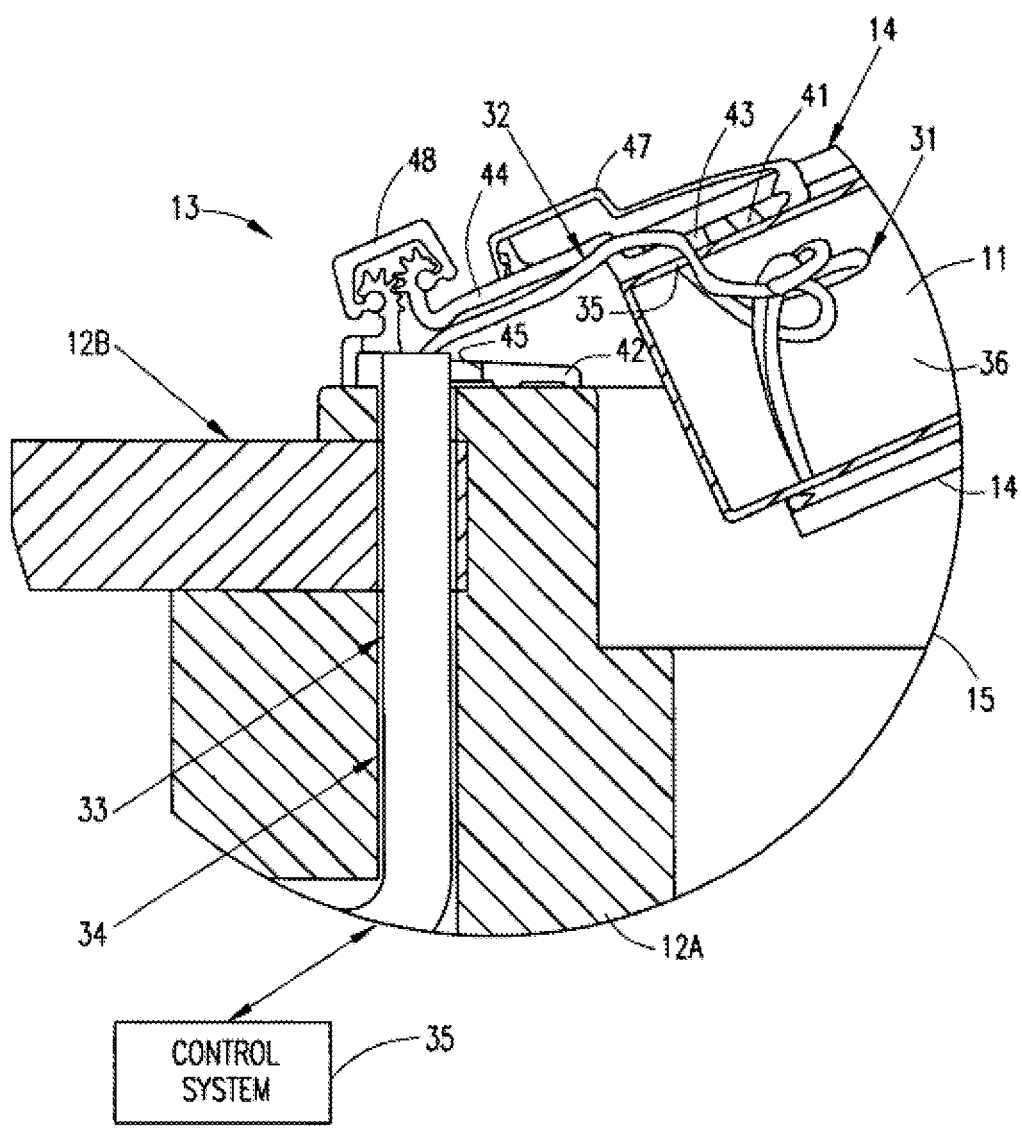
FIG. 3 illustrates a cross-sectional view of a door and hinge system of the embodiment of FIG. 1.
Figure 4:
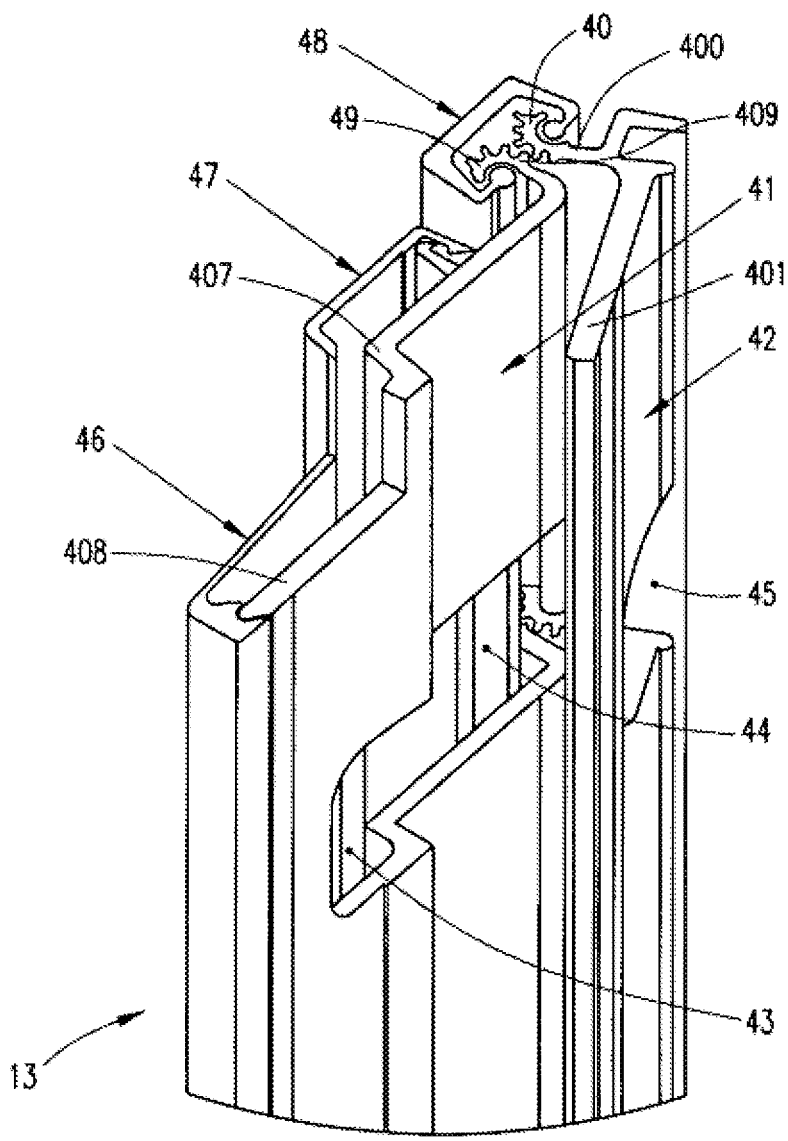
FIG. 4 illustrates a hinge structure of the embodiment of FIG. 1.
Figure 5:
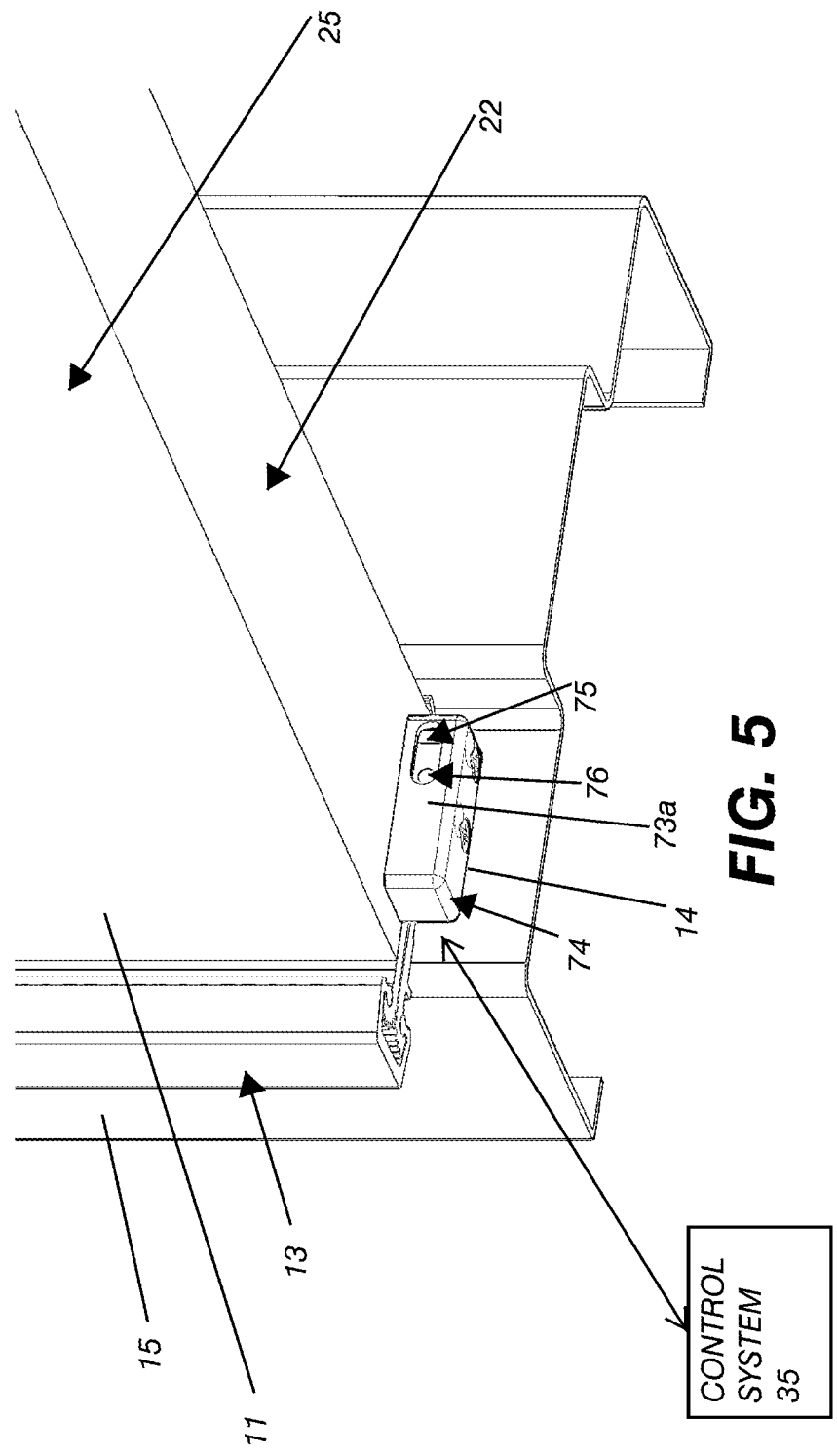
FIG. 5 illustrates a perspective view of a system for presence detection at the bottom surface of a door near a hinge, according to the embodiment of FIG. 1.
Figure 6:
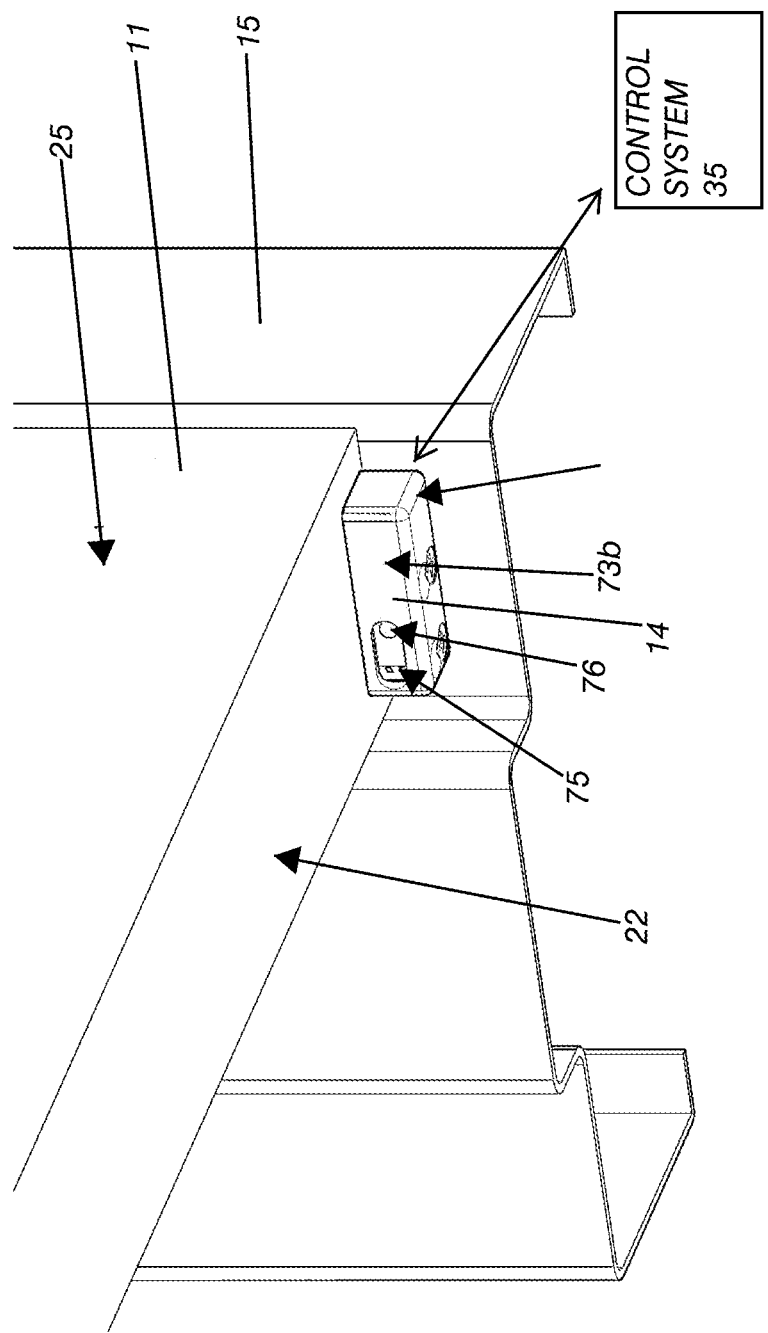
FIG. 6 illustrates a perspective view of a system for presence detection at the bottom surface of a door near a door jamb, according to the embodiment of FIG. 1.
Figure 7:
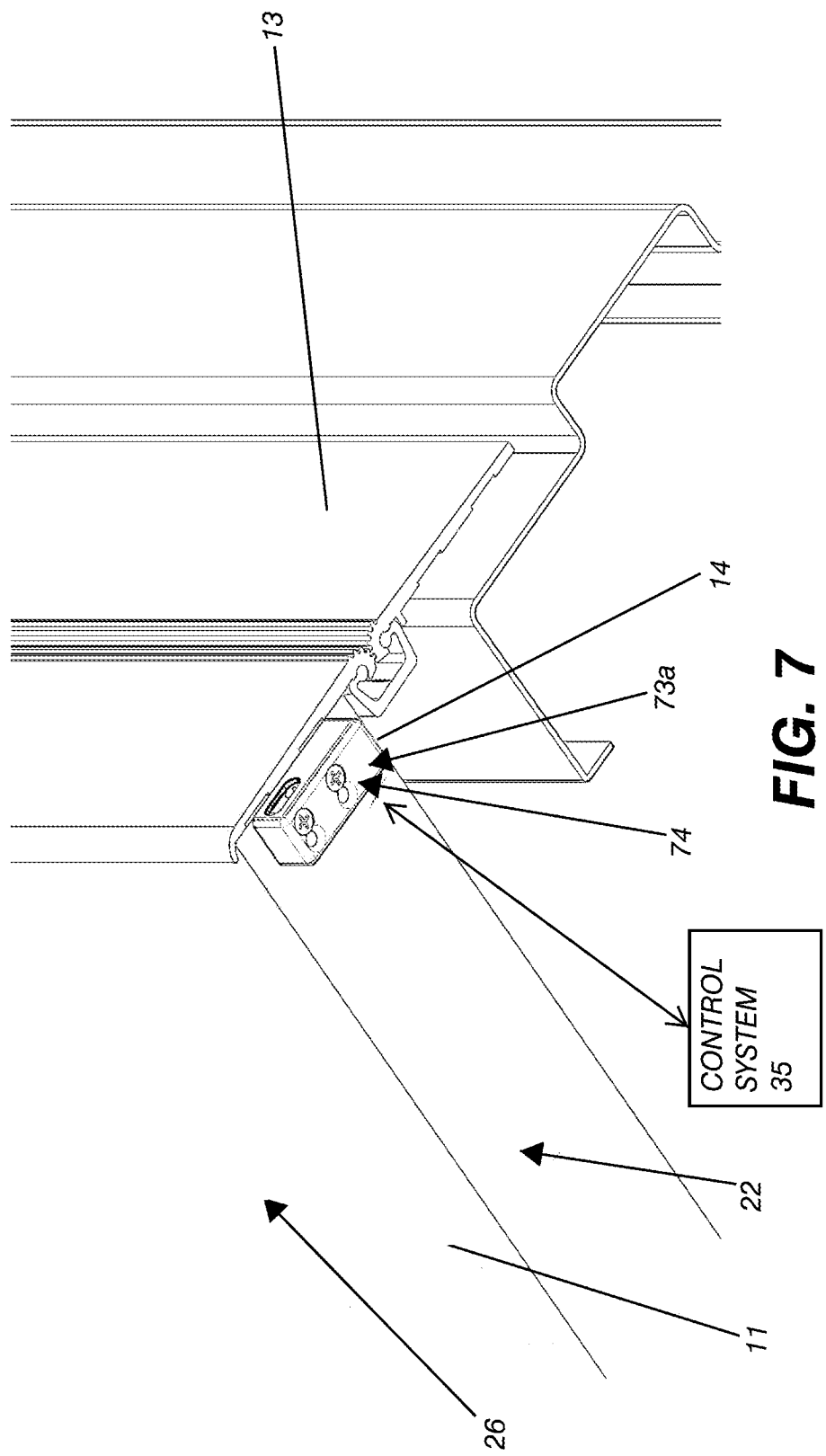
FIG. 7 illustrates a perspective view of a system for presence detection at the bottom surface of a door near a door hinge, while the door is in an open position, according to the embodiment of FIG. 1.
Figure 8:
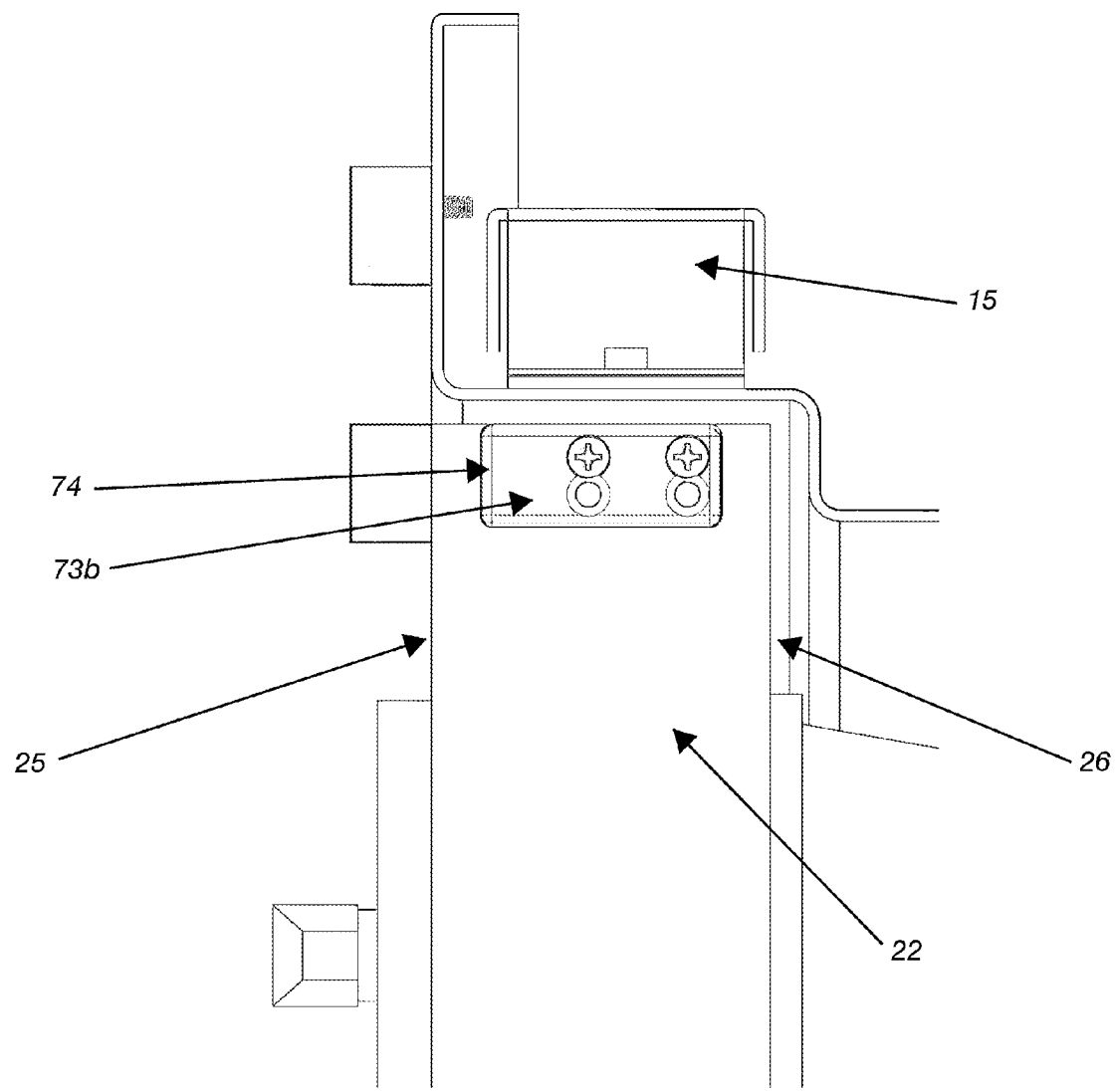
FIG. 8 illustrates a bottom view of a system for presence detection at the bottom surface of a door near a door jamb, according to the embodiment of FIG. 1.
Figure 9:
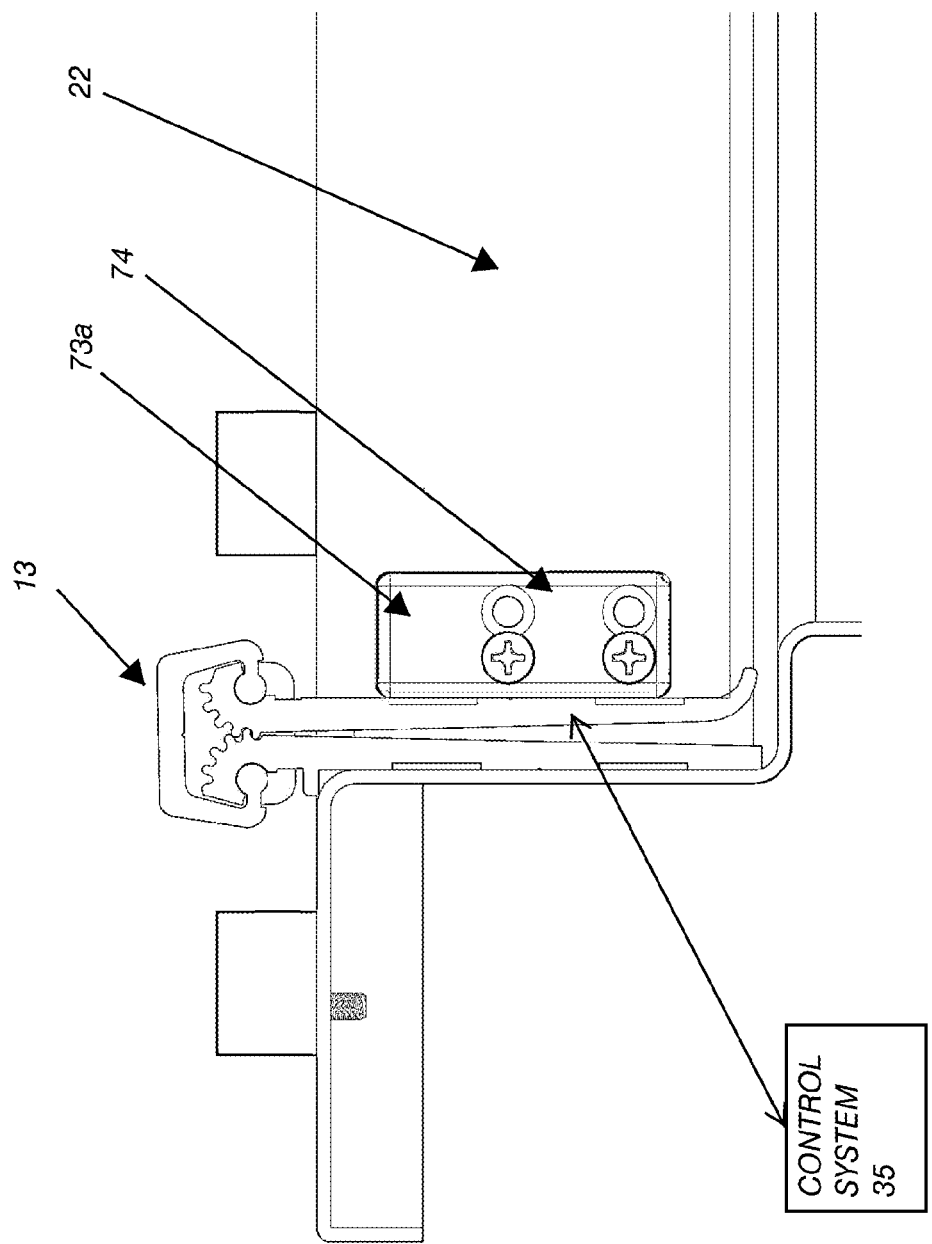
FIG. 9 illustrates a bottom view of a system for presence detection at the bottom surface of a door near a door hinge, according to the embodiment of FIG. 1.
Figure 10:
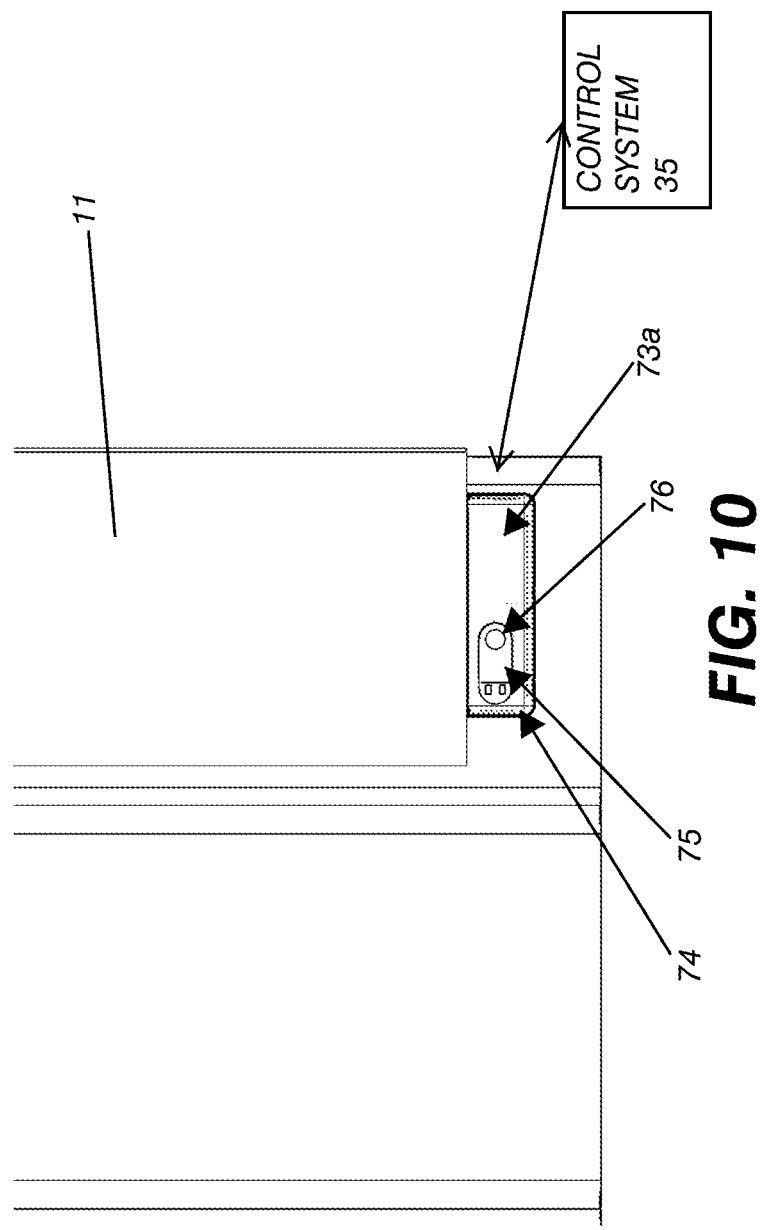
FIG. 10 illustrates a cross-sectional side view of a system for presence detection at the bottom surface of a door, according to the embodiment of FIG. 1.
Figure 11:
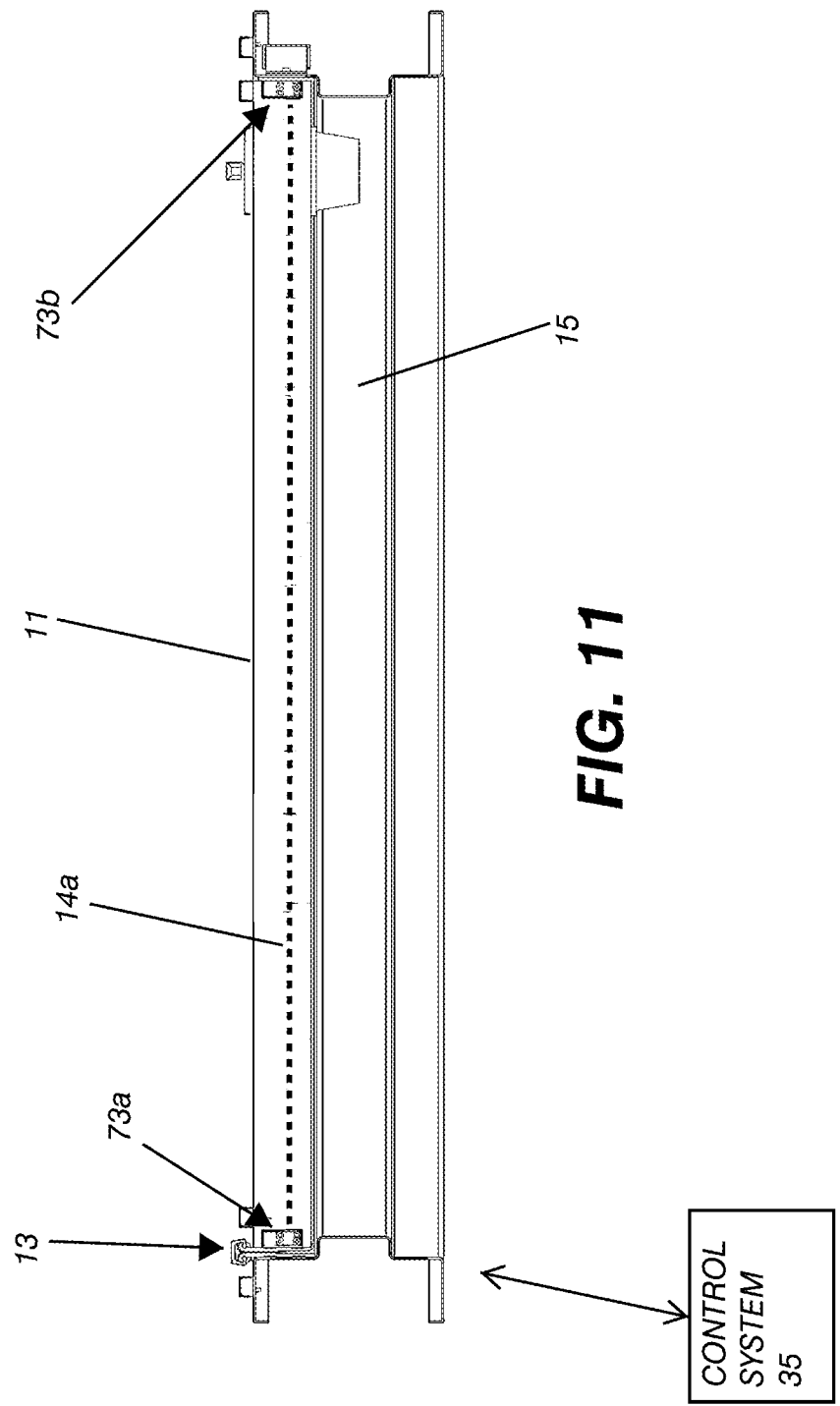
FIG. 11 illustrates a bottom view of a system for presence detection at the bottom surface of a door, according to the embodiment of FIG. 1.
Figure 28:
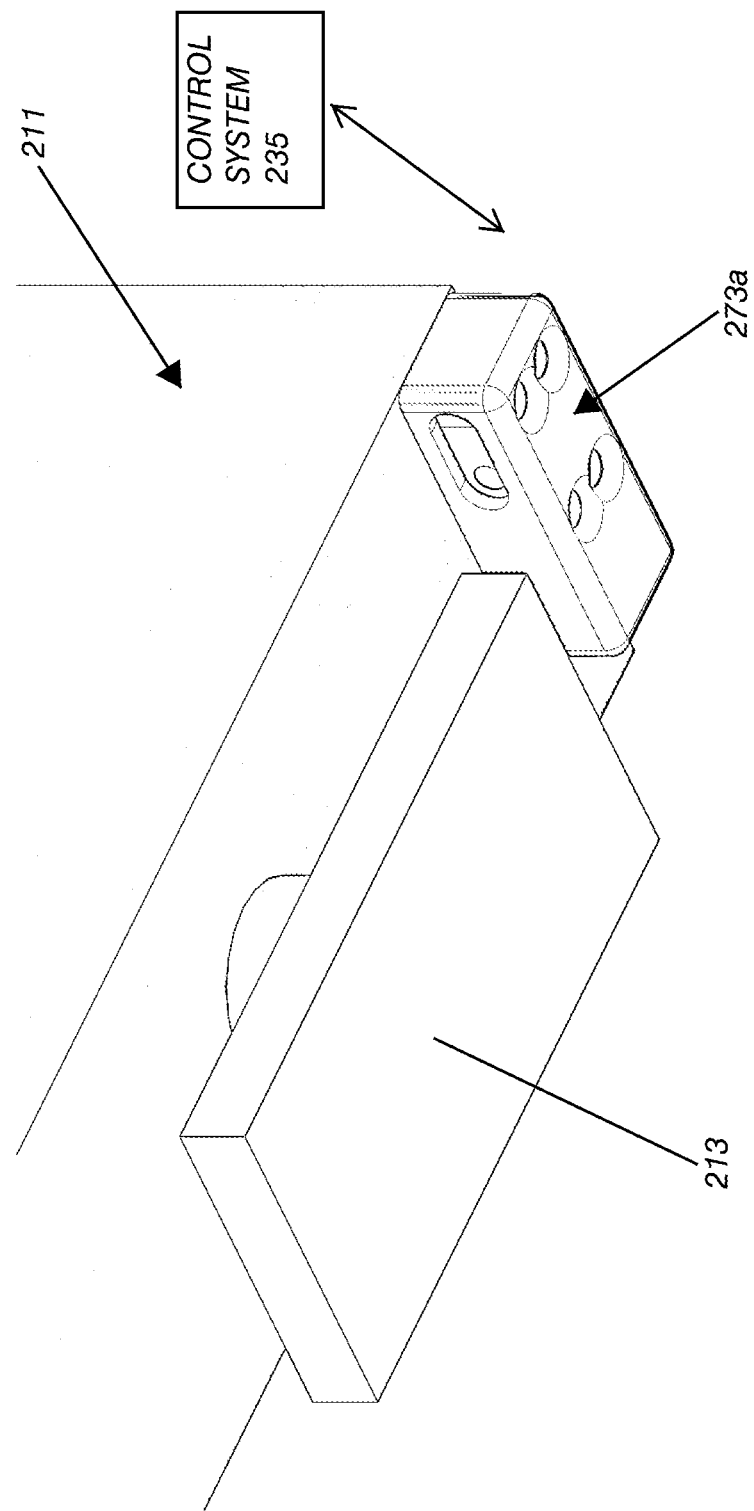
FIG. 28 illustrates a perspective view of a sensor for presence detection at the bottom surface of a door near a pivot hinge, according to an alternate embodiment of the invention.

The individual working components of the hinge system 13 used in the exemplary embodiment are further illustrated in FIGS. 3, 4, and 28. According to the embodiment, the hinge system 13 includes an elongate metal door portion 41 having a flange 408 for attachment to the door 11 by screws or other suitable fasteners (not shown), and an elongate metal frame portion 42 having a flange 401 for attachment to the door 11 by screws or other suitable fasteners (not shown), and an elongate metal frame portion 42 having a flange 401 for attachment to the door frame 15 by screws or other suitable fasteners (not shown). The door and frame portions 41 and 42 are approximately as long as the height of the door 11. The door and frame portions 41 and 42 have respective flanges 400 and 409 with respective gear structures 40 and 49 that are held in mutual engagement by an elongate joint cover, 48, forming a hinged joint between the door and frame portions. A cover 47 covers the door portion 41. When the door 11 is in the closed position, the flange 401 of the frame portion 42 is received in a notched section 407 between the flanges 408 and 409 of the door portion 41. The door 11 may be mounted to the frame in the "right hand hinge" position (however, embodiments of the invention may also employ hinges which are either of a "left hand hinge," a "right hand reverse hinge," or a "left hand reverse hinge").

As illustrated in FIG. 4, the hinge system 13 of the exemplary embodiment is adapted such that it is an "electrified hinge" 13. The term "electrified hinge" defines a hinge system 13 adapted for communication between a presence sensing arrangement 14 and a control system 35. The "electrified hinge" 13 allows power, detection, and monitoring signals to be transmitted by a cable 32 of electrical wires traversing through the "electrified" hinge 13, and into the interior space of the door 36. The cable 32 emerges from an opening 34 and traverses openings in the hinge system 13 and the door 11 to reach the interior space 36 of the door 11. There, the signal and power lines are separated, as shown at 31, and are connected to a presence sensing arrangement 14 via suitable openings (not explicitly shown). At the opposing end, the cables are connected to the control system 35.

A presence sensing arrangement 14, is comprised of three photoelectric sensor pairs 71, 72, 73 (although more or fewer photoelectric sensor pairs is contemplated by the invention) to detect the presence of an object at locations at or near the surface of the door 11, door frame 15, and hinge system 13. The photoelectric sensor pairs 71, 72, 73 are further comprised of transmitters 71a, 72a, 73a and receivers 71b, 72b, 73b. In the embodiment, each transmitter 71a, 72a, 73a and receiver 71b, 72b, 73b is protected by a protective sheath housing member 74. The protective sheath housing members are shaped such as to create non-ligature surfaces. For example, the protective sheath housing members of the exemplary embodiment are formed using acute angles, such as to limit obtrusive ligature surfaces, as further illustrated in FIGS. 12-14, 16. Each protective sheath housing member 74 contains an aperture 75 through which an optic portion 76 of each sensor can transmit/receive a signal. The transmitters 71a, 72a, 73a, receivers 71b, 72b, 73b, and protective sheath housing members 74 are affixed to the door 11 by screws or other suitable fasteners.

Each pair of photoelectric sensors 71, 72, 73 is positioned such that the transmitters 71a, 72a, 73a emit a beam of electromagnetic radiation (the path of electromagnetic radiation is illustrated as 14a in the attached drawings) which is detected by its respective receiver 71b, 72b, 73b. The presence of an object between the transmitters 71a, 72a, 73a and the receivers 71b, 72b, 73b, will signal the alarm system 18. In the exemplary embodiment, the photoelectric sensor pairs 71, 72, 73 are SUNX Model Number EX-20 ultra-compact photoelectric sensors (although other sensors are contemplated by embodiments of the invention).

Figure 12:
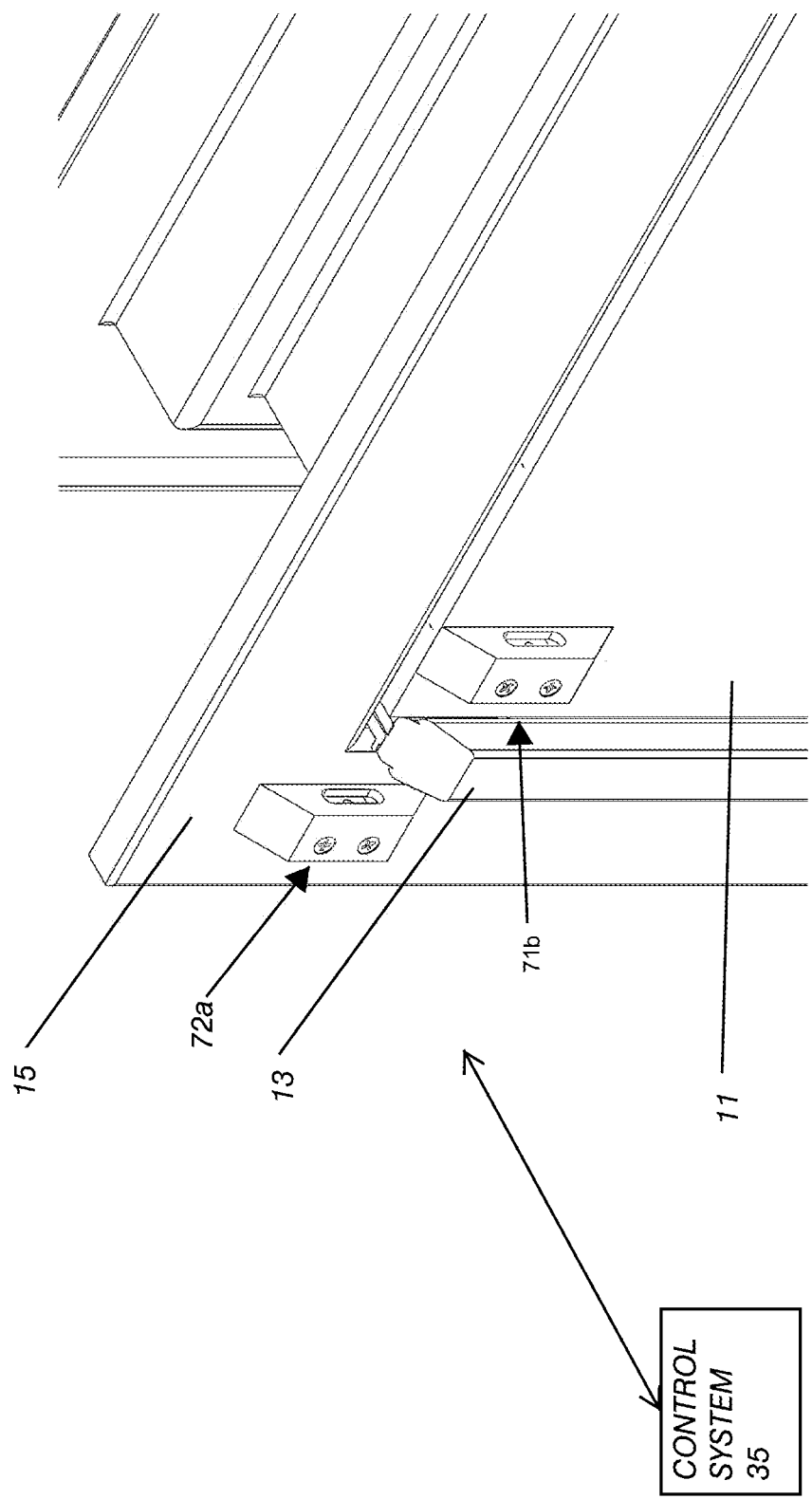
FIG. 12 illustrates a perspective view of a system for presence detection at the top surface of a door near a door hinge, according to the embodiment of FIG. 1.
Figure 13:
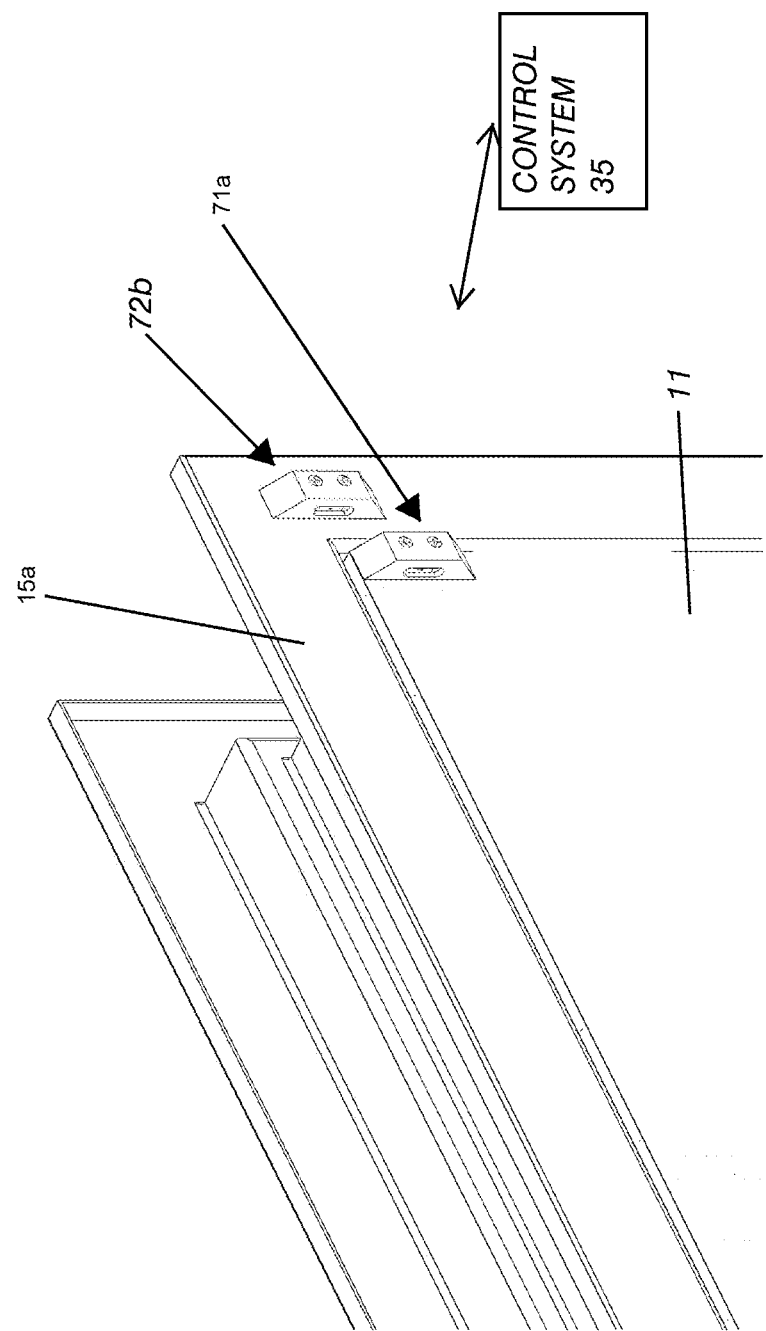
FIG. 13 illustrates a perspective view of a system for presence detection at the top surface of a door near a door jamb, according to the embodiment of FIG. 1.
Figure 14:
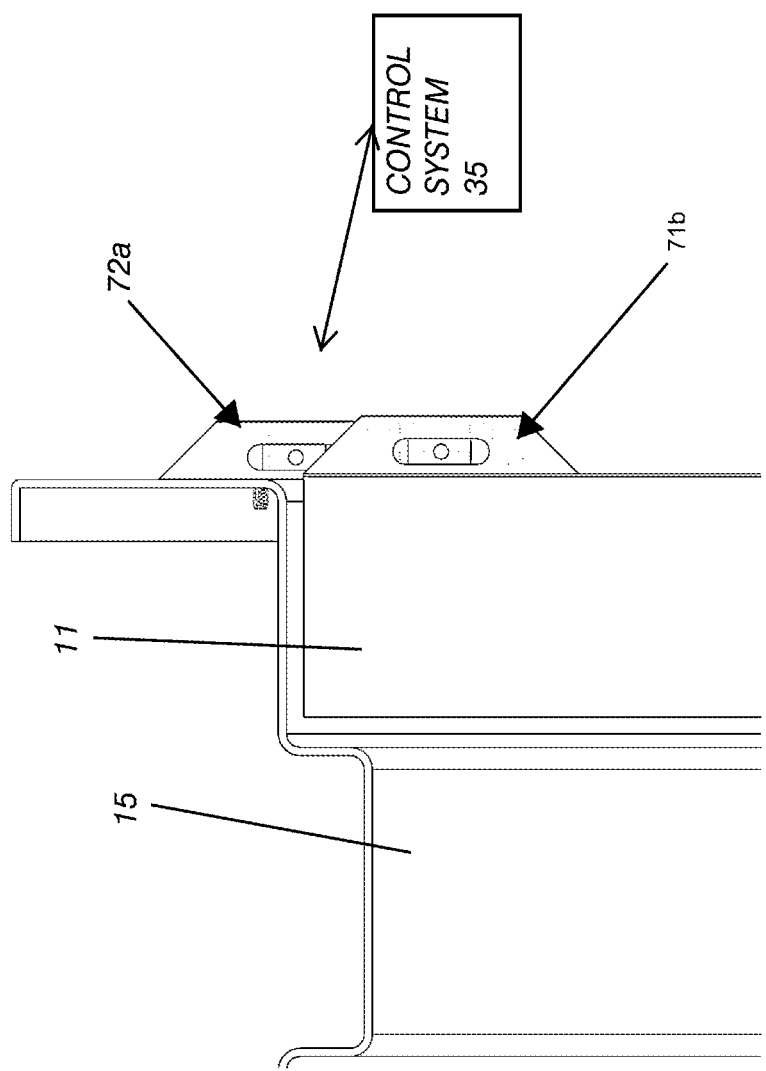
FIG. 14 illustrates a cross-sectional side view of a system for presence detection at the top surface of a door, according to the embodiment of FIG. 1.
Figure 15:
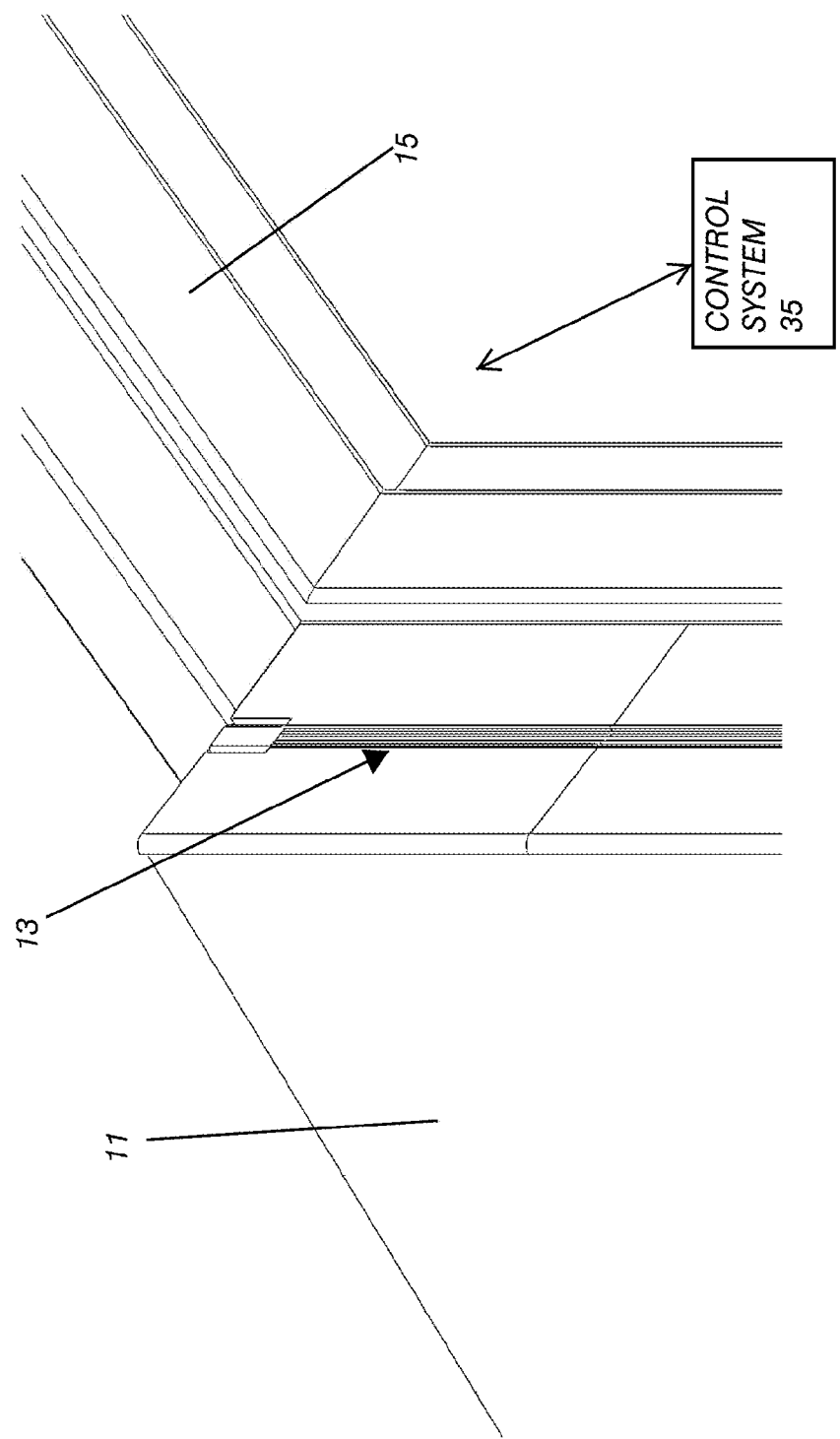
FIG. 15, illustrates axial rotation of the door into an open position about a hinge system, according to the embodiment of FIG. 1.
Figure 16:
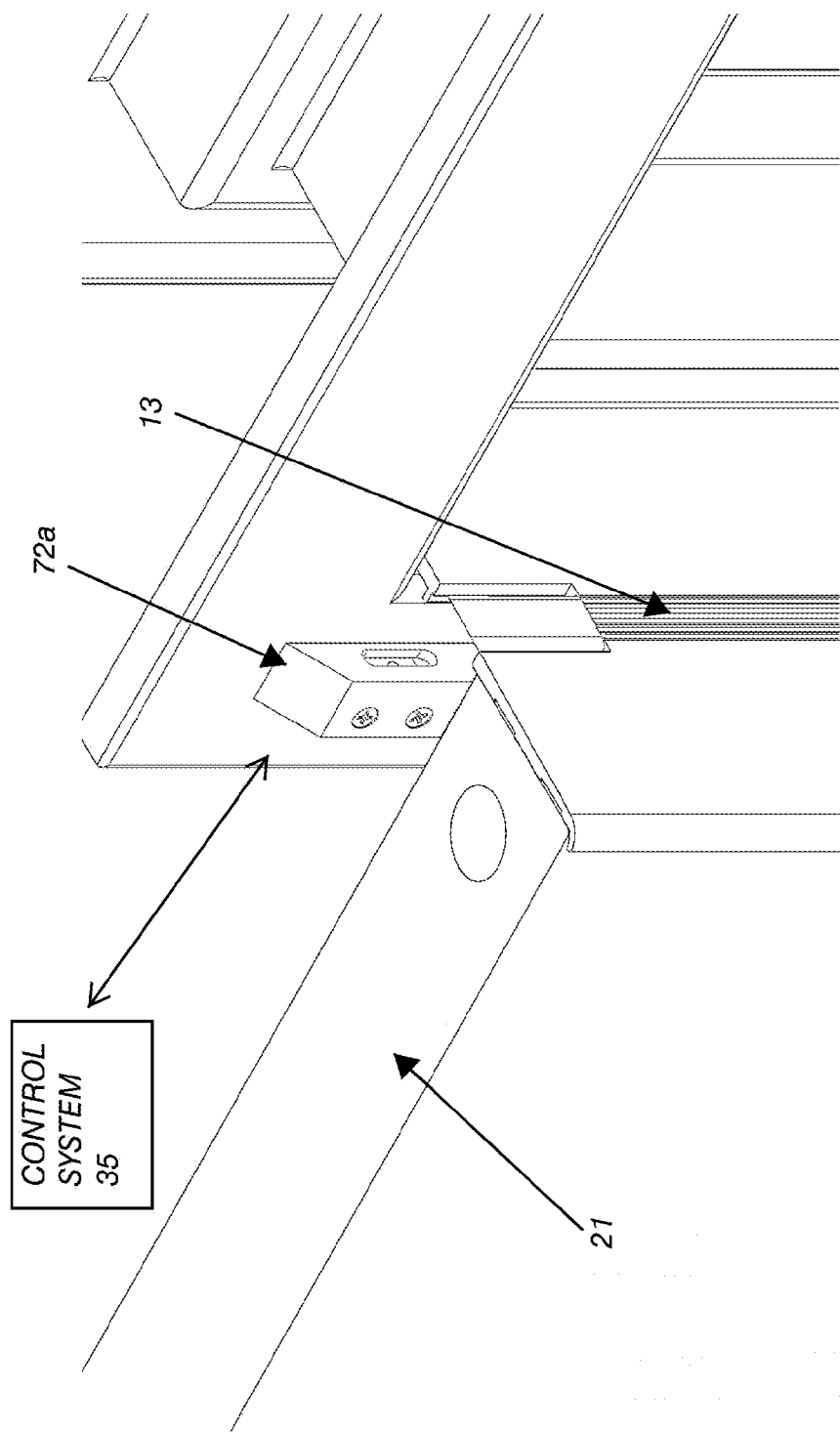
FIG. 16 illustrates a perspective view of a system for presence detection at the top of a door near a door hinge, while the door is in an open position, according to the embodiment of FIG. 1.
Figure 17:
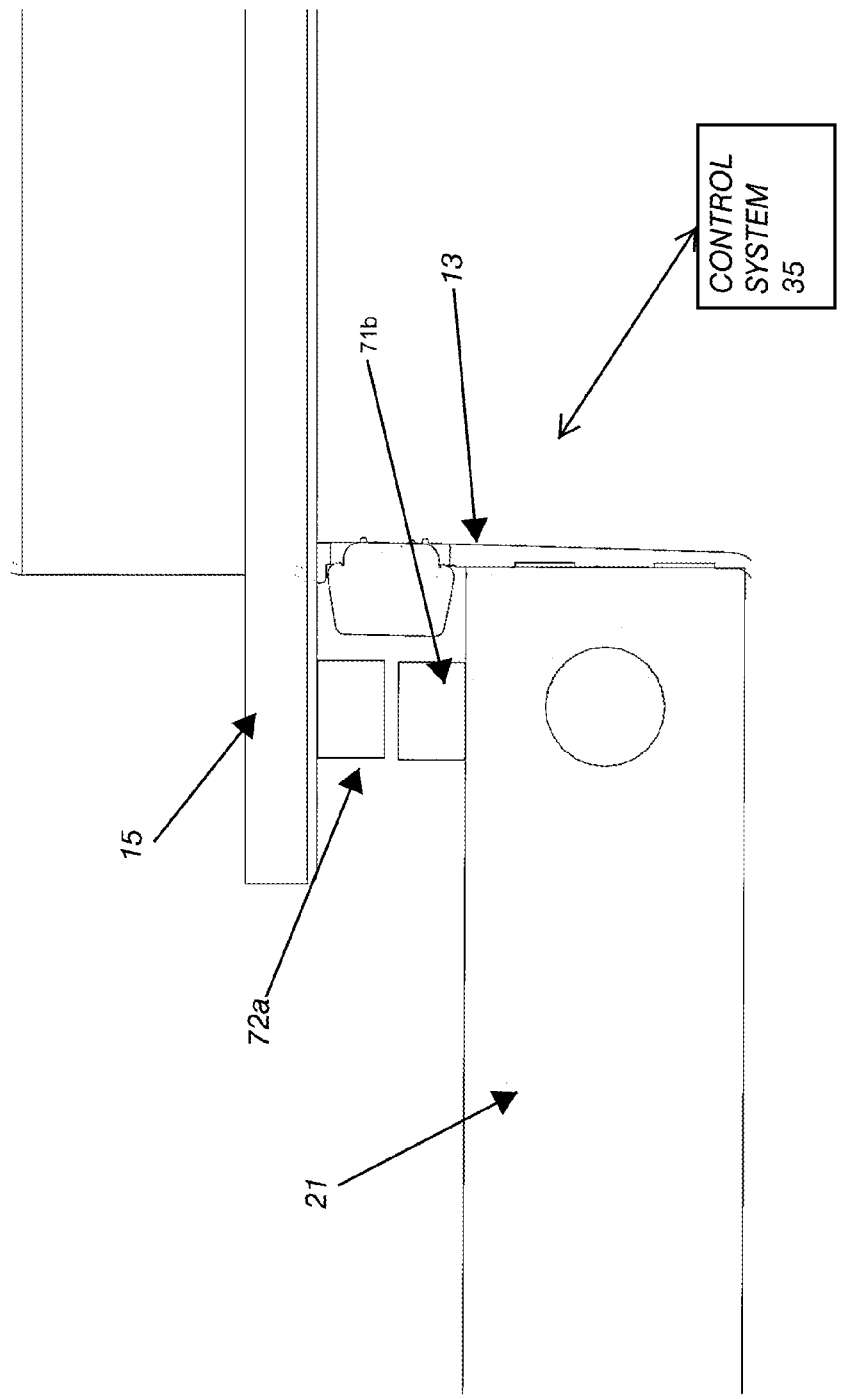
FIG. 17 illustrates a top view of a system for presence detection at the top surface of a door near a door hinge, according to the embodiment of FIG. 1.
Figure 18:
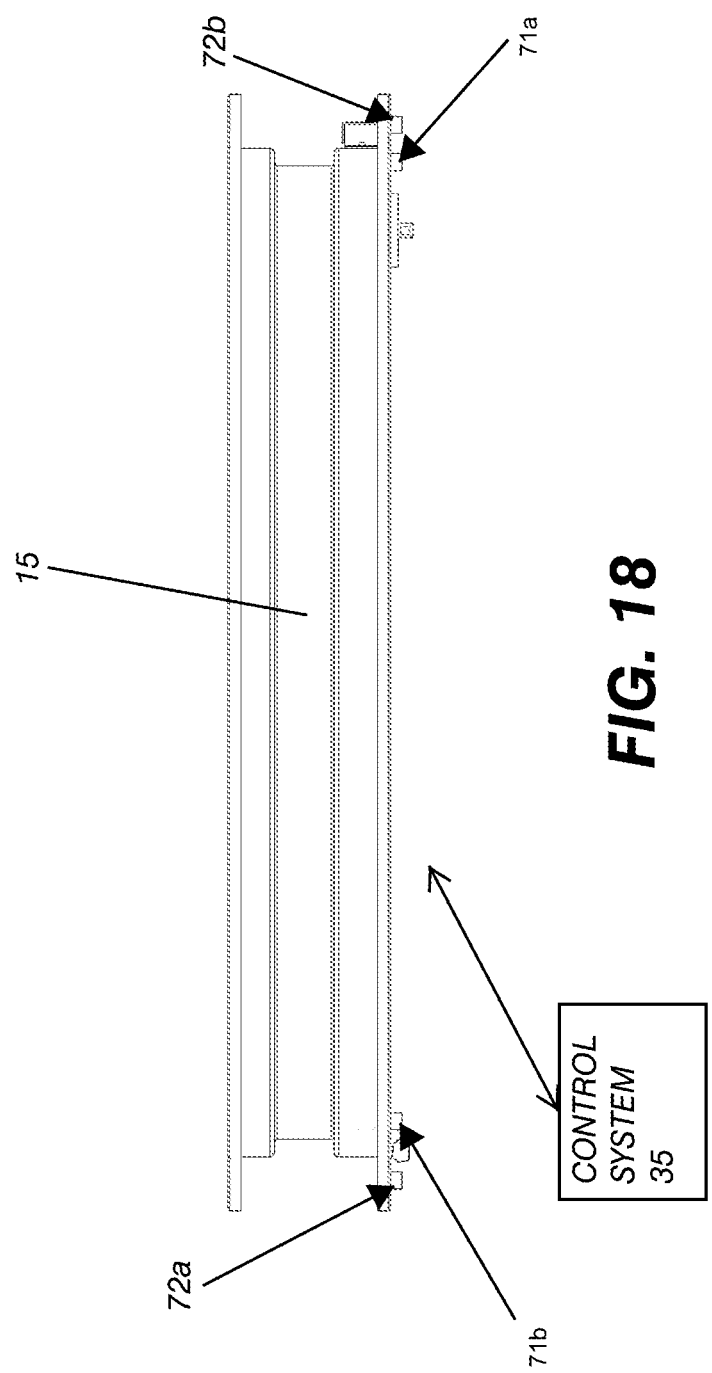
FIG. 18 illustrates a top view of a system for presence detection at the top surface of a door, according to the embodiment of FIG. 1.
Figure 19:
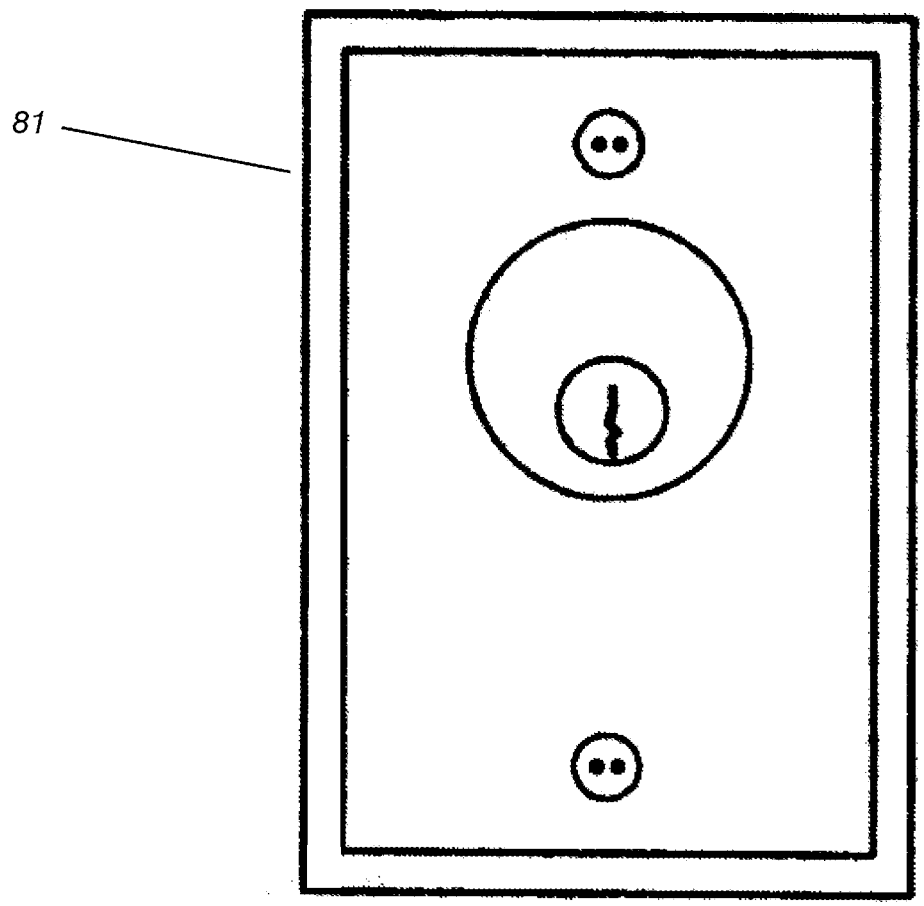
FIG. 19 illustrates a reset switch, according to the embodiment of FIG. 1.

A first pair of photoelectric sensors 71 is placed on the pull surface 25 of the door 11 (the side nearest the patient/detainee), near the top of the door, as illustrated in FIG. 12. The transmitter 71a is placed nearest the opening side surface 24 in its respective sheath housing member 74, and the receiver 71b is placed nearest the hinge side surface 23 at a distance of about the width of the door 11 from the transmitter 71a, as illustrated in FIGS. 12 and 13. The path 14a between the transmitter 71a and receiver 71b is substantially parallel with the ground.

A second pair of photoelectric sensors 72 is placed on the header 15a of the door frame 15 on the side of the header 15a nearest the patient/detainee, as illustrated in FIGS. 12-18. Specifically, the second pair of photoelectric sensors 72 is placed on the door frame face 61 in its respective sheath housing member 74, such that the path between transmitter 72a and receiver 72b is uninterrupted by the hinge structure 13 or other photoelectric sensor pair 71. This requires placement of the second pair of photoelectric sensors 72 at a higher elevation and slightly offset position, with respect to the first pair of photoelectric sensors 71, further illustrated in FIGS. 12 and 13. The transmitter 72a is placed nearest the hinge side surface 23, and the receiver 72b is placed nearest the open side surface 24 at a distance of slightly wider than width of the door 11 from the transmitter 72a. The path 14a between the transmitter 72a and receiver 72b is substantially parallel with the ground.

A third pair of photoelectric sensors 73 is placed on the bottom surface 22 of the door 11 (the side of the door parallel with the floor) in its respective sheath housing member 74. The transmitter 73a is placed nearest the hinge side surface 23, and the receiver 73b is placed nearest the opening side surface 24 at a distance of about the width of the door 11 from the transmitter 73a. However, in other embodiments, the transmitter 73a may also be placed nearest the opening side surface 24, and the receiver 73b may be placed nearest the hinge side surface 23 at a distance of about the width of the door 11 from the transmitter 73a. The path 14a between the transmitter 73a and receiver 73b is parallel with the ground. The transmitter 73a and receiver 73b remain affixed to the bottom surface 22 of the door during movement of the door 11. The path 14a between the transmitter 73a and receiver 73b is contiguous with the lower "gap" between the floor and the bottom surface 22 of the door. As shown, the transmitter 73a and receiver 73b are positioned such that they do not interfere with opening and closing of the door 11, as illustrated in FIGS. 5-11. Therefore, the presence of an object at or near the lower "gap" between the floor and the bottom surface 22 of the door will be detected.

A control system 35, monitors the status of the presence sensing arrangement 14. The control system 35 is an input/output device allowing an end user to selectively engage or monitor one or multiple presence detection arrangements 14 on one or a plurality of doors 11. The control system further defines an electromechanical apparatus which corresponds with an audio/visual control interface for the communication of selectively identified and maintained status information regarding the door 11, door frame 15, hinge system 13, and presence sensing arrangement 14. The presence sensing arrangement 14 is interconnected with the control system 35 with one or a plurality of cables 32, as previously described. In the exemplary embodiment, the control system 35 is a Hochiki America Corporation Model Number FireNET™ Plus 1127 analog addressable fire alarm control panel, with connection points for up to 127 sensors and modules, plus 127 analog sounder bases, for a total of 254 points possible per loop. However, embodiments of the invention may utilize other models and configurations of monitoring devices. The control system 35 monitors selectively identified and maintained status information such as: the operating condition of the individual sensors; the presence of an object at or near the sensors; and may allow the logging or download of such information via a computer or similar device.

Figure 20:
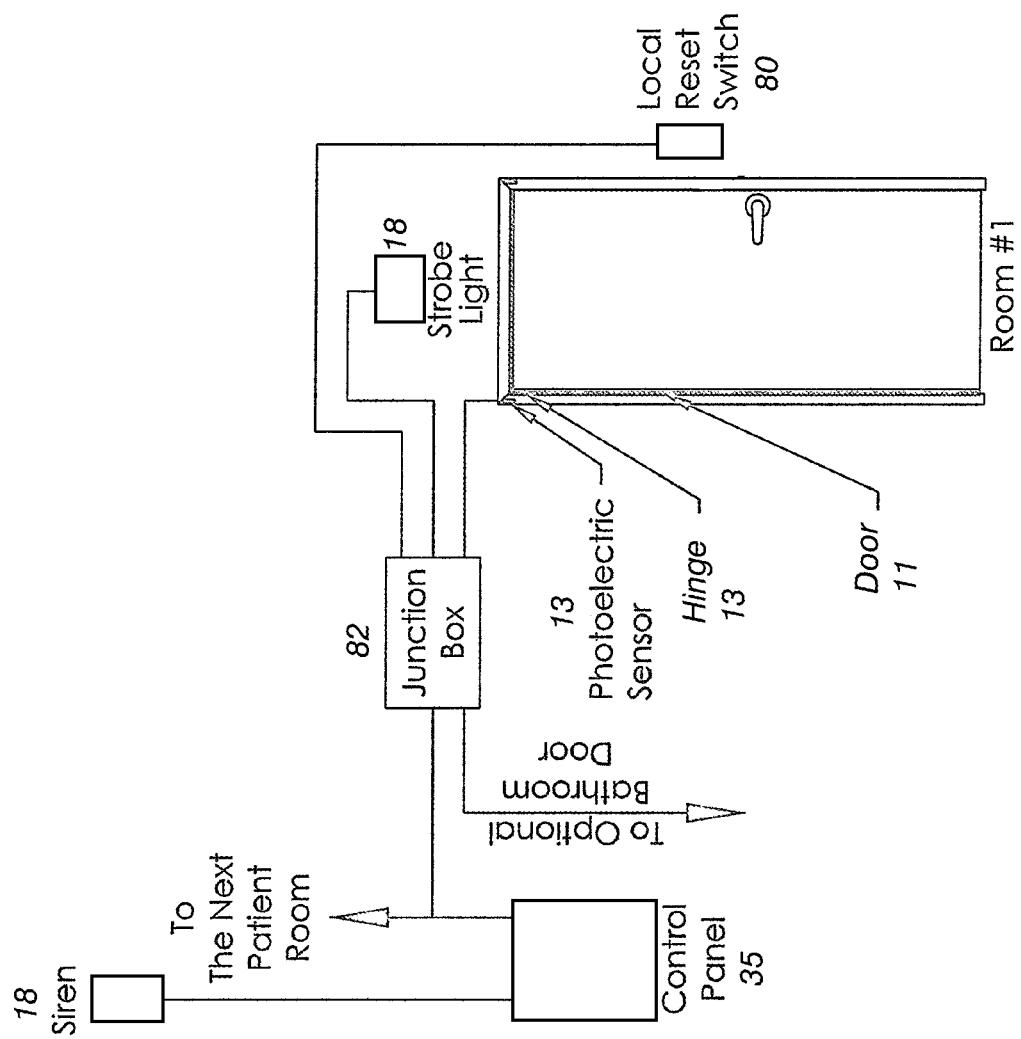
FIG. 20 illustrates a wiring schematic for a system of presence detection according to embodiments of the invention.
Figure 21:
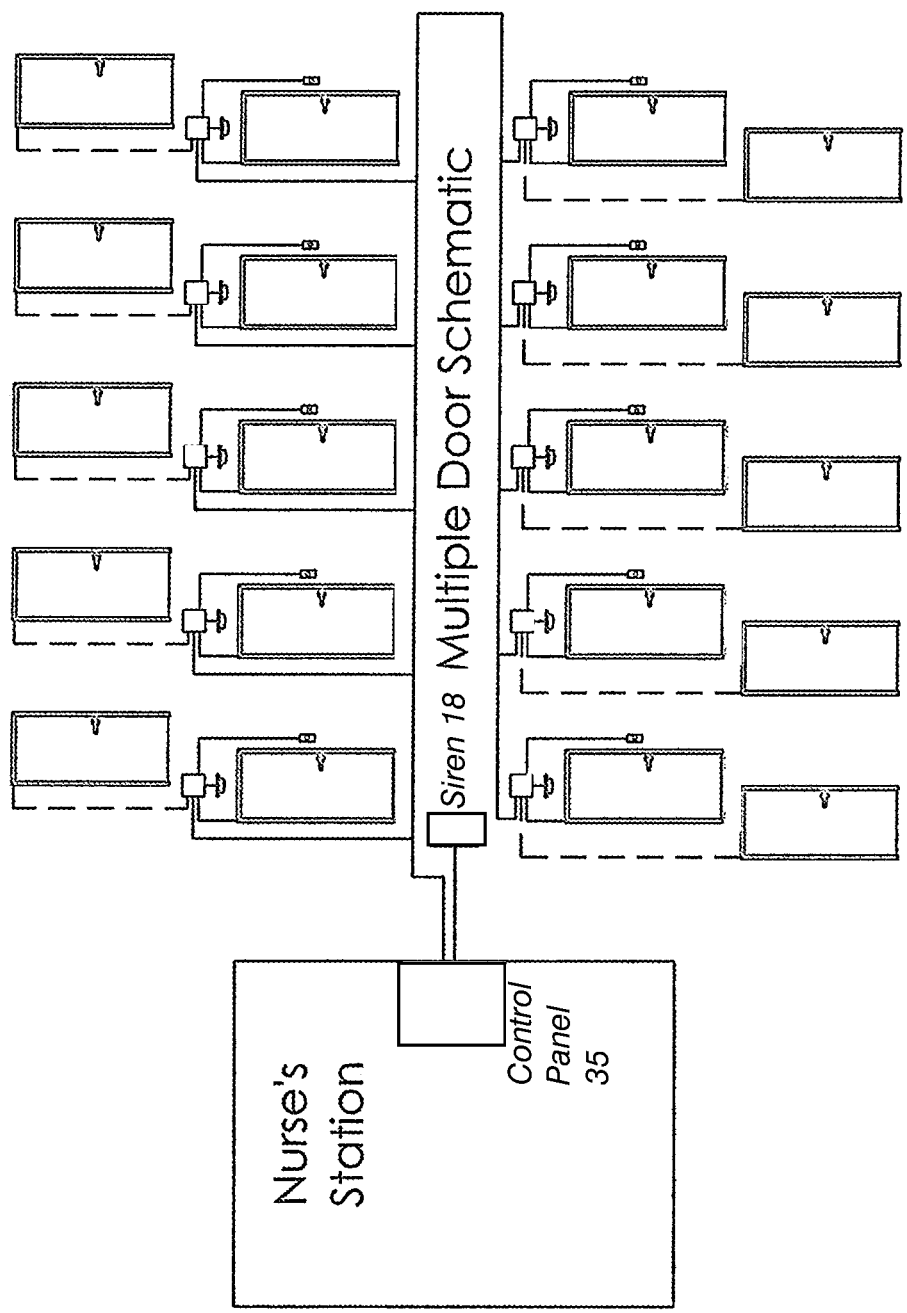
FIG. 21 illustrates a wiring schematic for a system of presence detection in multiple doors according to embodiments of the invention.
Figure 22:
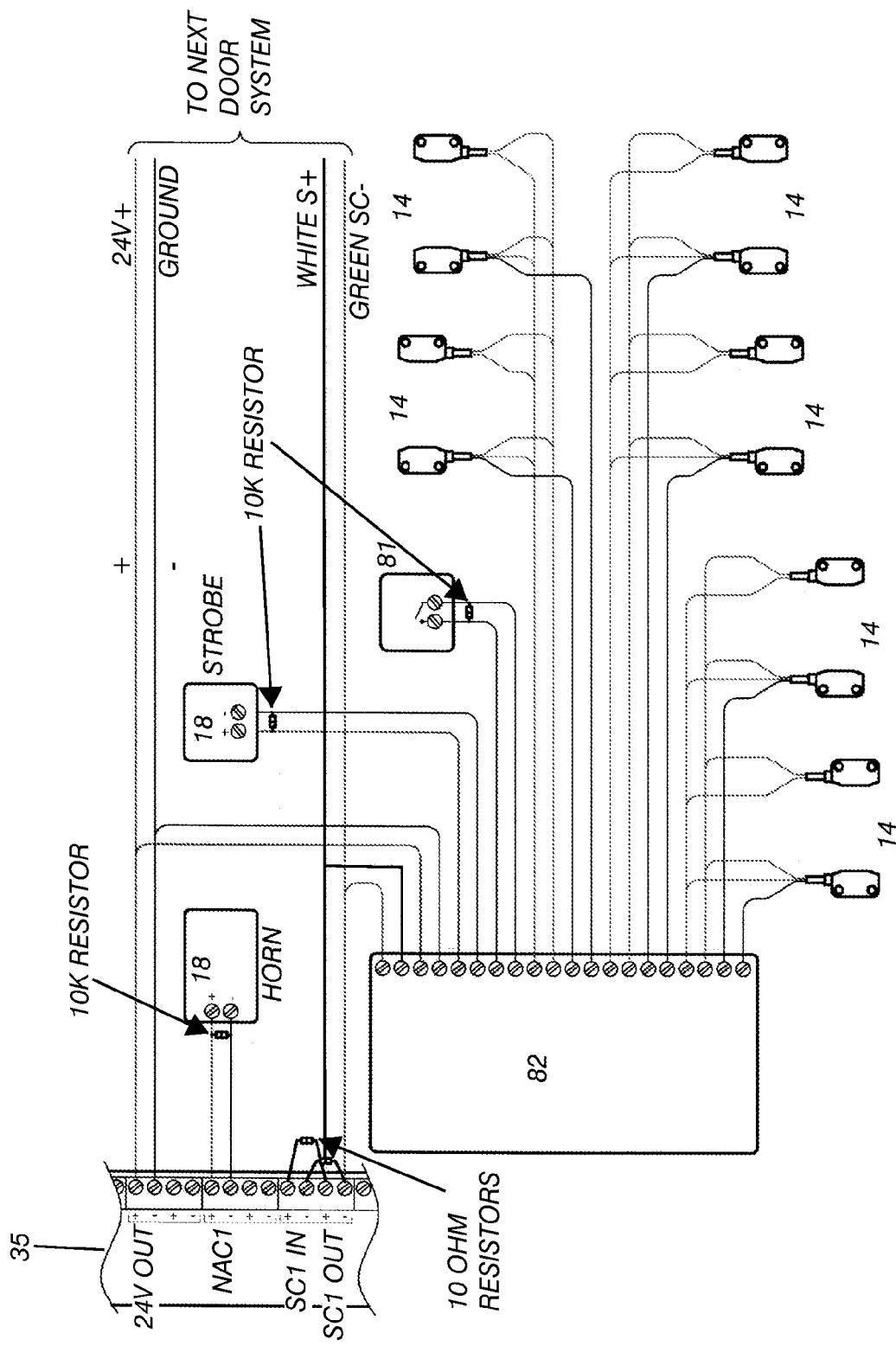
FIG. 22 illustrates a wiring schematic of a system of presence detection, showing a possible wiring configuration of a control system, junction box, alarm system, and presence detection arrangement, according to embodiments of the invention.

The control system 35 may also engage an alarm system 18, upon certain events, such as detection of the presence of an object at or near the signal path of any of the pairs of photoelectric sensors 71, 72, 73. The alarm system 18 may be an audio or visual alarm, visual display, manually or electronically operated switch, electrical power source, and/or sensor configuration control interface. The presence of an object at or near the signal path of any of the pairs of photoelectric sensors 71, 72, 73, may transmit a signal to the alarm system 18, which can alert appropriate personnel. In the exemplary embodiment, the alarm system is comprised of an audio and visual alarm (not shown). The visual alarm of the exemplary embodiment comprises a light emitting diode fixed behind a Gentex Model GCC/GCS ceiling mount horn/strobe combination, fixedly attached to a nearby wall or ceiling. The audio alarm of the exemplary embodiment further comprises a Gentex Model GX91/GX93 remote signaling apparatus fixedly attached to a nearby wall or ceiling. The purpose of such an alarm system 18 is to prevent patient suicide by the detection of presence at or near the pairs of photoelectric sensors 71, 72, 73. A reset switch 81, is a key activated switch, which can be used to reset the system after the object is removed. The control system 35 may be connected to the alarm system 18 and presence detection arrangement 14 by one or a number of cables 32. The system may also include a junction box 82, which can serve as a connection bus for the integrated cables 32. A possible wiring schematic is illustrated in FIG. 20. A wiring schematic for presence detection on a plurality of doors is further illustrated in FIG. 21. FIG. 21 illustrates a wiring configuration for 10 door arrangements. However, embodiments of the invention can accommodate more or fewer of such door arrangements. A possible wiring integration schematic is further illustrated in FIG. 22. However, other embodiments of interconnectivity are contemplated by the invention.

The presence of an object (particularly a ligature) at or near selected door surfaces triggers detection in the presence sensing arrangement 14, thereby communicating with the control system 35, and triggering the alarm 18. The use of pairs of photoelectric sensors 71, 72, 73 along the interior surfaces, top surfaces, and bottom surfaces of a door and door frame is contemplated by the invention. In addition, sensors may be added to other surfaces of the door and door frame for added protection against patient suicide as selected. The result of which will be the early detection and prevention of suicide assisting ligature elements.

For purposes of the invention, the presence sensing arrangement 14 of the invention may be placed to detect the presence of an object at or near the "surfaces of the door and door frame." The "surfaces of the door and door frame" comprise the peripheral surfaces of: the door frame 15; the opening 16; the header 15a, the lock jamb 15b, the hinge jamb 15c; the door frame face 61; the door frame stop 62; the door frame soffit 63; the door frame rabbet 64; door 11; the top surface 21; the bottom surface 22; the hinge side surface 23; the opening side surface 24; the pull surface 25; and the push surface 26, as described herein. Therefore, it is specifically within the scope of embodiments of the invention to selectively place photoelectric sensors (or other functional equivalents of the presence sensing arrangement 14) in a manner to effectively detect the presence of an object at or near the surfaces of: the door frame 15; the opening 16; the header 15a, the lock jamb 15b, the hinge jamb 15c; the door frame face 61; the door frame stop 62; the door frame soffit 63; the door frame rabbet 64; door 11; the top surface 21; the bottom surface 22; the hinge side surface 23; the opening side surface 24; the pull surface 25; and the push surface 26 as described herein. Placement of a pair of photoelectric sensors may be achieved such that the path of the signal between the transmitter and receiver corresponds with the surface area at or near the previously defined surfaces of the door or door frame. Therefore, it is also contemplated that the placement of a presence sensing arrangement may be placed at or near the hinge system 13 (which is adjacent to the door 11), such that the placement of such presence sensing arrangement 14 is capable of detecting the presence of a ligature "wedged" between the surfaces of the door and door frame and the hinge system. It is contemplated that embodiments of the invention may comprise a presence sensing arrangement 14 integrated into such a hinge system 13.

How the Invention is Used

Embodiments of the invention are used to detect the presence of an object at or near the surfaces of the door, door frame, and hinge system of the door. The purpose of the invention is to prevent patient/detainee suicide from ligatures or similar apparatuses placed at or near the previously defined surfaces. The placement of presence detecting sensors along various surfaces of the door, allows for detection. The signal path of the sensors remains uninterrupted during opening and closing of the door. As an object is placed at or near the sensors, the signal path is interrupted, thereby allowing detection. Detection of the presence of such an object sends a signal to a control system, which may trigger an alarm. Patients/detainees may be monitored through such a system for suicide prevention. Additionally, the placement of such sensors on the bottom surface of the door, and the top surface of the door prevents other methods of patient/detainee suicide, such as draping a ligature beneath the door, in the "gap" between the door and the floor/door frame; and the top of the door, in the "gap" between the door and wall surface/door frame.

Advantages of the Invention

The system detects the presence of an object as opposed to pressure at or near the surfaces of the door, door frame, and hinge system. The presence sensing arrangement of embodiments of the invention may utilize sensors to detect such a presence. One or a number of such sensors may be selectively placed on a number of door surfaces, as selected by user based on differing needs such as: the size of the door: the configuration of the hinge; the type of hinge used; type of door used; and/or configuration of the door frame. Additionally, such sensors may be placed on both sides of the door, on the door frame, or on the upper and lower surfaces of the door. Additionally, such sensors may be placed or integrated within the hinge system. The advantage to such a system is that it may effectively counter advanced method of patient/detainee suicide. For example, placement of a presence sensing sensor on the top surface or on the upper surface of the door (as contemplated by embodiments of the invention) allows detection when a patient/detainee may deploy a flexible elongate member along the surface of the door, near the door hinge, or at outer periphery points wherein the door frame receives the door. Placement of a presence sensing sensor on the bottom surface of the door (as contemplated by embodiments of the invention) allows detection when a patient/detainee may "loop" the flexible elongate member around a door hinge or ligature point (in either an open or closed door position) to escape detection. Placement of a presence sensing sensor on the door or door frame surfaces near the hinge system (as contemplated by embodiments of the invention) allows detection when a patient/detainee may "wedge" a ligature system in between the door and hinge.

Alternatives

Although the invention has been set forth in the previously described best mode, other alternative embodiments are possible. For example, in another embodiment, the door frame 15 and door 11 are as described in the preceding paragraph. In the embodiment, the presence sensing arrangement 14 allows for photoelectric sensors additionally be placed on the hallway side of the door 11 as follows: on the outer surface of the door (the side nearest the hallway and opposite the patient/detainee); on the outer side of the door frame (the side nearest the hallway and opposite the patient/detainee); on the outer periphery of the top side of the door (the side parallel with the door frame header and the ground); near the bottom of the door; along the spaces between the door and the door frame; and along the inner and outer periphery of the door surface, on both the inner and outer periphery surface of the door. The object of such a system is to sense the presence of an object at or near the door periphery (on both sides of the door), door frame, near the hinge, and on both the top and bottom surface of the door, for prevention of suicide attempts by the patient/detainee.

Other embodiments may use alternative designs for the presence sensing arrangement 14. For example, the presence sensing arrangement 14 of embodiments of the invention may be; sensors employing "thru beam" technology; sensors employing diffused technologies; multi-pixel sensors; laser sensors; fiber-optic sensors; ultra-sonic sensors, or equivalents and permutations thereof. The presence sensing arrangement 14 of the exemplary embodiment set forth the use of SUNX Model Number EX-20 ultra-compact photoelectric sensors. The sensors set forth may be any of the following: front sensing thru-beam sensors; side sensing thru-beam sensors; side sensing retroreflective sensors; side sensing diffuse reflective sensors; front sensing diffused beam type convergent reflective sensors; side sensing small spot beam type convergent reflective sensors; side sensing large distance spot beam type narrow-view reflective sensors; functional equivalents, and/or permutations thereof.

Other embodiments may use alternate placement arrangements for the presence sensing arrangement 14. For example, the exemplary embodiment comprises three pairs of photoelectric sensors: a first pair of photoelectric sensors 71 door mounted near the top of the door 11; a second pair of photoelectric sensors 72 frame mounted near the top of the door; and a third pair of photoelectric sensors 73 door mounted to the bottom surface of the door 11, in the "gap" between the floor and the bottom of the door 11. However, it is contemplated by the invention to use more or fewer sensors, as needed for presence detection. For example, an embodiment of the invention may comprise only one pair of photoelectric sensors, door mounted to the bottom of the door in the "gap" between the floor and the bottom of the door 11. Yet another embodiment may comprise a pair of photoelectric sensors mounted to the top of the door 11, in the "gap" between the top of the door 11, and door frame header 15*a*. Alternatively, other embodiment of the invention may contain more sensors than the exemplary embodiment.

Additionally, the inventive concept of embodiments of the invention contemplate a presence sensing arrangement 14 placed along: the door frame 15; the opening 16; the header 15*a*, the lock jamb 15*b*, the hinge jamb 15*c*; the door frame face 61; the door frame stop 62; the door frame soffit 63; the door frame rabbet 64; door 11; the top surface 21; the bottom surface 22; the hinge side surface 23; the opening side surface 24; the pull surface 25; and the push surface 26 as described herein. The presence sensing arrangement 14 of such embodiments may comprise the use of photoelectric sensors. The presence sensing arrangement may also be located on the hinge system 13. The path 14*a* between such photoelectric sensors may be perpendicular with the ground (as opposed to parallel in the previous paragraphs) to accommodate placement as previously described.

In other embodiments, the type of door may vary. For example, the embodiments previously listed pertain to hollow core doors. Embodiments of the invention may also employ the use of solid core or metal doors. The embodiment previously set forth uses a door, capable of axial rotation about a hinge system. Embodiments of the current invention will also be directed towards sliding doors or equivalents thereof.

In other embodiments, the type of hinge may vary. For example, the hinge may be a full mortise hinge, a half mortise hinge, a full surface hinge, a pivot hinge, or equivalents thereof.

FIG. 28 illustrates an alternative embodiment of the invention using a pivot hinge 213. In the embodiment, a door 211, a door frame 215, and presence sensing arrangement 214 is as described in the exemplary embodiment. However, a third pair of presence detecting sensors 273 is fixedly attached to the bottom surface 222 of the door 211, such that the path of the beam is offset from the pivot hinge 213, as illustrated in FIG. 28. In this configuration, the path of the beam can "shoot" around the pivot hinge 213. The offset position of the presence detection sensors 273, allows operation of the presence detecting sensors 273, such that they do not interfere with opening and closing of the door 211. Therefore, the presence of an object at or near the lower "gap" between the floor and the bottom surface 222 of the door will be detected.

Figure 29:
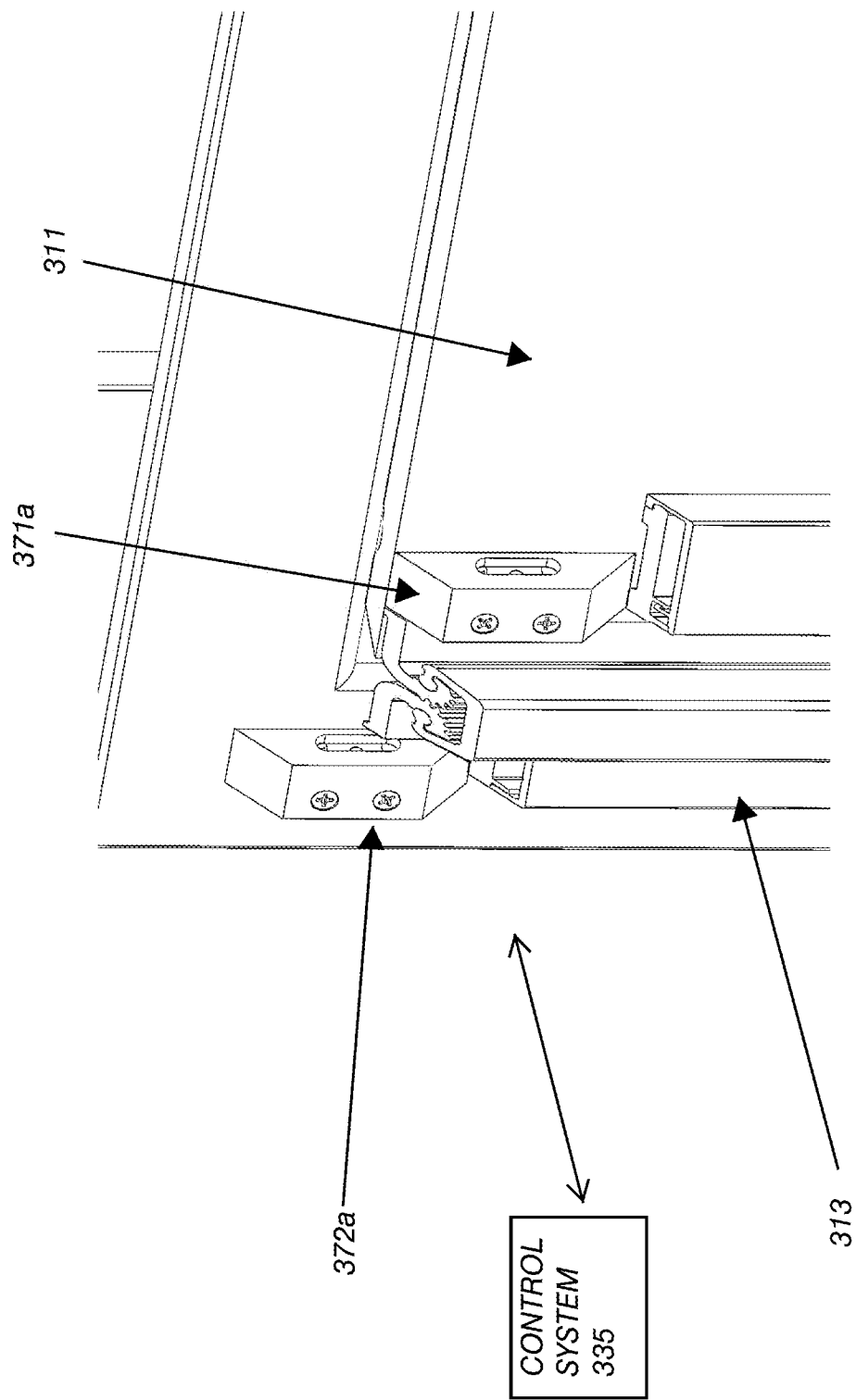
FIG. 29 illustrates a perspective view of a system for presence detection at the bottom surface of a door, where the hinge is a full surface hinge, according to an alternate embodiment of the invention.

FIG. 29 illustrates an alternative embodiment of the invention using a full surface hinge 313. In the embodiment, a door 311, a door frame 315, and presence sensing arrangement 314 is as described in the exemplary embodiment. However the type of hinge (a full surface hinge 313) allows axial rotation of the door in both an open or closed position. The presence of an object at or near the surfaces of the door, door frame, or hinge system will be detected by the presence sensing arrangement 314.

Interconnectivity between the elements described may also be by wireless transmission. For example, the presence sensing arrangement, the control system, and the alarm system may communicate via wireless technology as opposed to the "hard wired" cables set forth in the exemplary embodiment. Such wireless embodiments can include a number of designs implementing the inventive concept. Embodiments of the invention could use a wireless transmitter and wireless receiver, communicating via RFID (Radio Frequency Identification). Other embodiments of the invention may implement Wi-Fi technology used in the computer industry. Yet other embodiments of the invention may implement either of: radio frequency communication; microwave communication; infrared (IR) communication; point-to-point communication; point-to-multipoint communication; broadcasting; cellular networks; or permutations thereof.

Figure 30:
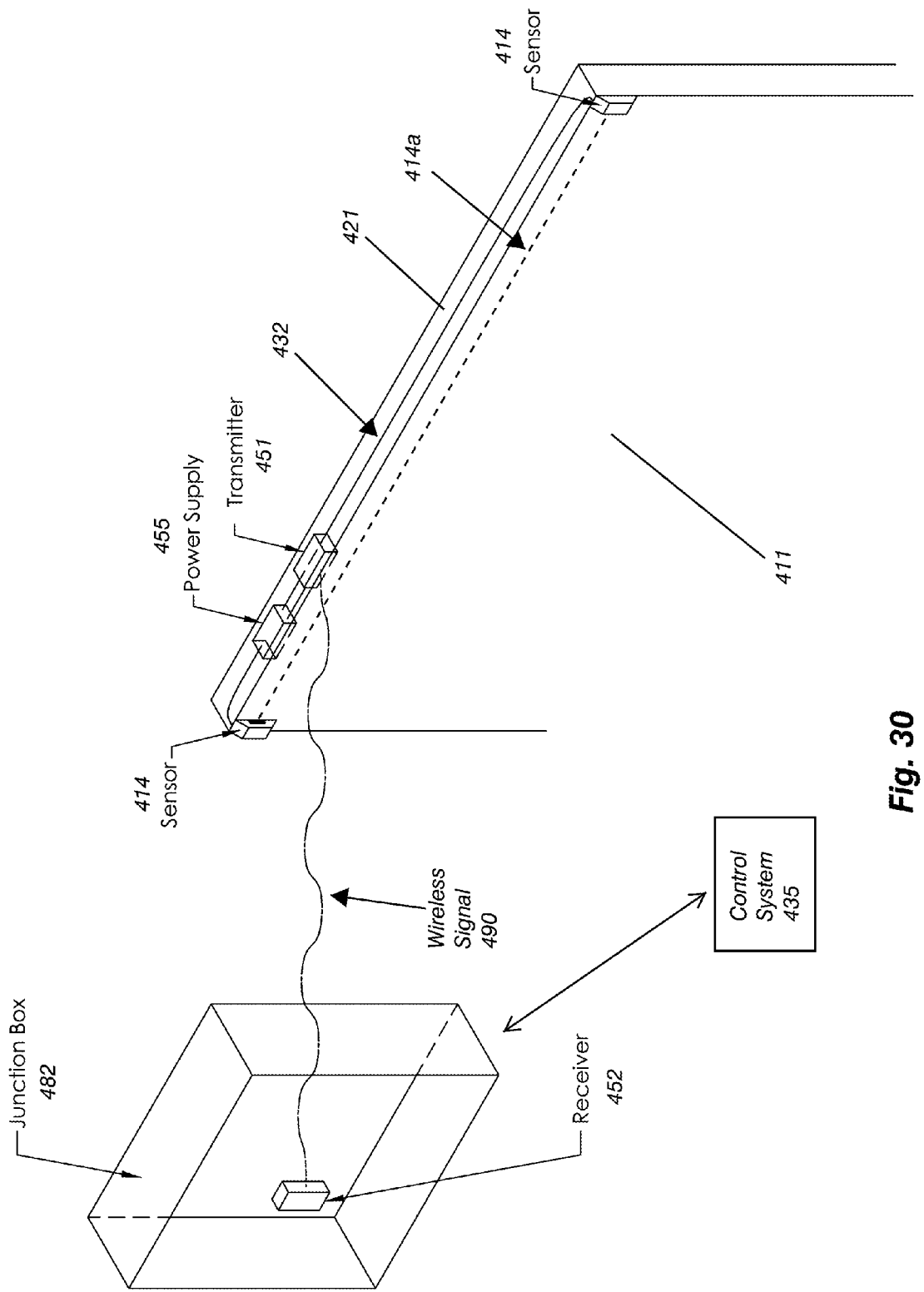
FIG. 30 illustrates a perspective view of a system for presence detection using wireless technology, according to an alternate embodiment of the invention.

FIG. 30 illustrates an embodiment of the invention implementing wireless technology. In the embodiment, a door 411 and presence sensing arrangement 414 is as described in the exemplary embodiment (the path between the sensors is illustrated as 414*a* in FIG. 30). A wireless transmitter 451 is located on the top surface 421 of the door 411, and is connected to the photoelectric sensors via a cable 432. A power source 455 is connected to the wireless transmitter 451. A wireless receiver 452 is placed in a junction box 482. A control system 435 is connected to the wireless receiver 452 inside the junction box 482. The wireless transmitter 451 communicates with the wireless receiver 452 using RFID (Radio Frequency Identification) communication. The photoelectric sensors 414 transmit an electrical signal via the cable 432 to the wireless transmitter 451 upon the detection of an object at or near the surfaces of the door 411 and door frame 415. The wireless transmitter 451 transmits a wireless detection signal (illustrated as 490 in FIG. 30) to the wireless receiver 452. The wireless receiver 452 then communicates with the control panel 435 (such communication may be either with or without the use of wires or cables).

Differing combinations and permutations of the embodiments set forth are contemplated by the current invention. Additionally, all functional equivalents of materials used and means of attachment of elements are contemplated by the current invention. Therefore, the spirit and scope of the appended claims should not be limited to the descriptions of the preferred versions and alternate embodiments set forth herein.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

What is claimed is:

1. A system of presence detection in a door assembly, comprising: a door frame, wherein said door frame defines an opening; a door mounted in said opening, wherein said door is allowed to operate from open to closed position with respect to said door frame; a hinge system located between said door frame and said door; a presence sensing arrangement comprising a first sensor pair, a second sensor pair, and a third sensor pair which allows detection of the presence of an object along surfaces of said door, door frame, hinge system; or the upper and lower surfaces of said door and door frame in either an open or closed position of said door, and during the movement of the door from open to closed position of said door, and irrespective of the pressure said object exerts against said door, hinge system, or said door frame; wherein said first sensor pair is located on an outer surface of said door; wherein said second sensor pair is located on said door frame, and said third sensor pair located on a bottom surface of said door in a gap between the ground and the door; wherein said first sensor pair comprises a first transmitter and a first receiver located a distance apart and forming a first sensing path between said first transmitter and said first receiver; wherein said second sensor pair comprises a second transmitter and a second receiver located a distance apart and forming a second sensing path between said second transmitter and said second receiver, said sensing path aligned with a space between said upper surface of said door and said door frame, approximately parallel with said upper surface of said door; wherein said third sensor pair comprises a third transmitter and a third receiver located a distance apart and forming a third sensing path between said third transmitter and said third receiver, said third sensing path aligned approximately parallel with said bottom surface of said door; wherein each of said first transmitter, said second transmitter, said third transmitter, said first receiver, said second receiver, and said third receiver are placed in a protective sheath housing member; wherein said protective sheath housing member has an outer body shape forming a non-ligature surface defined by one or more acute angles along said outer body shape, said protective sheath housing member comprising an aperture; and wherein said second transmitter and said second receiver are placed on said door frame such that said second sensing path is uninterrupted by said hinge system, said door, said first sensor pair, or movement of said door in a direction towards either of said second transmitter or said second receiver.

2. The system of presence detection of claim 1, wherein either of said first sensor pair, said second sensor pair, or said third sensor pair utilizes photoelectric sensors for presence detection.

3. The system of presence detection of claim 2, wherein said first sensor pair, said second sensor pair, and said third sensor pair utilize photoelectric sensors for presence detection.

4. The system of presence detection of claim 3, wherein said first sensor pair is placed on the pull surface of said door, near the top of said door; and wherein said second sensor pair is placed on said door frame, near the top of said door; and wherein a third sensor pair of said photoelectric sensors is placed on the bottom surface of said door, for detection of the presence of an object in a gap between said door and the floor.

5. The system of presence detection of claim 2, wherein said first sensor pair, said second sensor pair, or said third sensor are either of: side sensing thru-beam sensors; side sensing retroreflective sensors; side sensing diffuse reflective sensors; front sensing diffused beam type convergent reflective sensors; side sensing small spot beam type convergent reflective sensors; side sensing large distance spot beam type narrow-view reflective sensors; sensors employing "thru beam" technology; sensors employing diffused technologies; multi-pixel sensors; laser sensors; fiber-optic sensors; ultrasonic sensors; functional equivalents; or permutations thereof.

6. The system of presence detection of claim 2, wherein said first sensor pair are placed on either of: the pull surface of said door; or the push surface of said door.

7. The system of presence detection of claim 1, wherein said hinge system allows said door to be movable from open to closed position, with respect to said door frame.

8. The system of presence detection of claim 7, wherein said hinge system is either of: a full mortise hinge; a half mortise hinge; a full surface hinge; or a pivot hinge.

9. The system of presence detection of claim 7, wherein said presence sensing arrangement is placed at said hinge system.

10. The system of presence detection of claim 1, further comprising a control system.

11. The system of presence detection of claim 10, wherein said control system is an input and output device allowing an end user to selectively engage and monitor said presence detection arrangement.

12. The system of presence detection of claim 11, wherein said presence sensing arrangement and said control system are interconnected using wireless technology.

13. The system of presence detection of claim 12, wherein said control system monitors selectively identified and maintained status information including: the operating condition of said presence detecting sensors; the presence of an object near said presence detecting sensors; and wherein said controls system allows the logging and download of such information via a computer.

14. The system of presence detection of claim 1, further comprising an alarm system.

15. The system of presence detection of claim 14, wherein said alarm system may be either of: an audio alarm; a visual alarm; a visual display; a manually or electronically operated switch; an electrical power source; or a sensor configuration control interface and said control system may trigger said alarm system upon the detection of presence of an object near the surfaces of said door, door frame, and the upper and lower surfaces of said door and door frame from open to closed position of said door.

16. The system of presence detection of claim 1, further comprising a reset switch and a junction box.

17. The system of presence detection of claim 1, wherein said door frame further comprises: a header; a lock jamb; a hinge jamb; a door frame face; a door frame stop; a door frame soffit; and a door frame rabbet; and said door comprises a top surface; a bottom surface; a hinge side surface; an opening side surface; a pull surface; and a push surface; and said presence sensing arrangement is placed to detect the presence of an object near the surfaces of either of: said door frame; said opening; said header; said lock jamb; said hinge jamb; said door frame face; said door frame stop; said door frame soffit; said door frame rabbet; said door; said top surface; said bottom surface; said hinge side surface; said opening side surface; said pull surface; or said push surface.

18. The system of presence detection of claim 1, wherein said presence detection arrangement is placed on a plurality of said doors.

19. The system of presence detection of claim 18, wherein said presence detection arrangement further comprises at least one control system.

* * * * *